(12) United States Patent
Soshi

(10) Patent No.: US 10,850,433 B2
(45) Date of Patent: Dec. 1, 2020

(54) MOLD MANUFACTURING METHOD, NON-TRANSITORY COMPUTER-READABLE STORAGE MEDIUM, AND CONTROLLER

(71) Applicants: ADVANCED RESEARCH FOR MANUFACTURING SYSTEMS, LLC, Woodland, CA (US); DMG MORI CO., LTD., Yamatokoriyama (JP)

(72) Inventor: Masakazu Soshi, Woodland, CA (US)

(73) Assignees: ADVANCED RESEARCH FOR MANUFACTURING SYSTEMS, LLC, Woodland, CA (US); DMG MORI CO., LTD., Yamatokoriyama (JP)

( * ) Notice: Subject to any disclaimer, the term of this patent is extended or adjusted under 35 U.S.C. 154(b) by 190 days.

(21) Appl. No.: 16/311,068

(22) PCT Filed: Mar. 23, 2017

(86) PCT No.: PCT/JP2017/011738
§ 371 (c)(1),
(2) Date: Dec. 18, 2018

(87) PCT Pub. No.: WO2018/003209
PCT Pub. Date: Jan. 4, 2018

(65) Prior Publication Data
US 2020/0023558 A1 Jan. 23, 2020

(30) Foreign Application Priority Data
Jun. 27, 2016 (JP) .................................. 2016-126877

(51) Int. Cl.
*B29C 33/38* (2006.01)
*B33Y 80/00* (2015.01)
(Continued)

(52) U.S. Cl.
CPC .......... *B29C 33/3842* (2013.01); *B33Y 80/00* (2014.12); *B22F 3/008* (2013.01); *B29L 2031/757* (2013.01); *B33Y 30/00* (2014.12)

(58) Field of Classification Search
CPC ..... B29C 33/3842; B29C 33/38; B33Y 80/00; B33Y 30/00; B22F 3/008; B29L 2031/757
See application file for complete search history.

(56) References Cited

U.S. PATENT DOCUMENTS 8,681,308 B2 * 3/2014 Berkvens ............ G03F 7/70341
355/30
8,738,166 B2 * 5/2014 Abe ........................ B22C 9/061
700/120

(Continued)

FOREIGN PATENT DOCUMENTS

JP 2002-322501 A 11/2002

OTHER PUBLICATIONS

International Search Report dated Apr. 25, 2017 in PCT/JP2017/011738 filed Mar. 23, 2017.

(Continued)

*Primary Examiner* — Ramesh B Patel
(74) *Attorney, Agent, or Firm* — Oblon, McClelland, Maier & Neustadt, L.L.P.

(57) ABSTRACT

A mold manufacturing method includes machining, based on a final outer shape of a mold, a workpiece including a plurality of separate blocks. The plurality of separate blocks are selected based on the outer shape, all or part of the plurality of separate blocks are provided with through holes for forming a flow path. The mold manufacturing method further includes adding a material to the workpiece through an additive manufacturing technology employing directed energy deposition as an additive manufacturing process, so
(Continued)

as to form, on a surface of the machined workpiece, a continuous surface based on the outer shape.

10 Claims, 33 Drawing Sheets

(51) Int. Cl.
*B33Y 30/00* (2015.01)
*B22F 3/00* (2006.01)
*B29L 31/00* (2006.01)

(56) References Cited

U.S. PATENT DOCUMENTS

| | | | |
|---|---|---|---|
| 8,916,085 B2 * | 12/2014 | Jackson | B29C 64/106 |
| | | | 264/401 |
| 9,937,589 B2 * | 4/2018 | Soshi | B23K 26/14 |
| 2009/0301968 A1 * | 12/2009 | Little | B01F 5/0496 |
| | | | 210/638 |
| 2012/0041586 A1 * | 2/2012 | Abe | B33Y 80/00 |
| | | | 700/120 |
| 2016/0282839 A1 * | 9/2016 | Soshi | B23K 26/14 |

OTHER PUBLICATIONS

Japan Patent Office, "Patent application technical trends surveys (Fiscal 2013): 3D printer," [online], Mar. 2014, [Accessed on May 20, 2016], Internet (URL: http://www.jpo.go.jp/shiryou/pdf/gidou-houkoku/25_3dprinter.pdf), 51 pages.

* cited by examiner

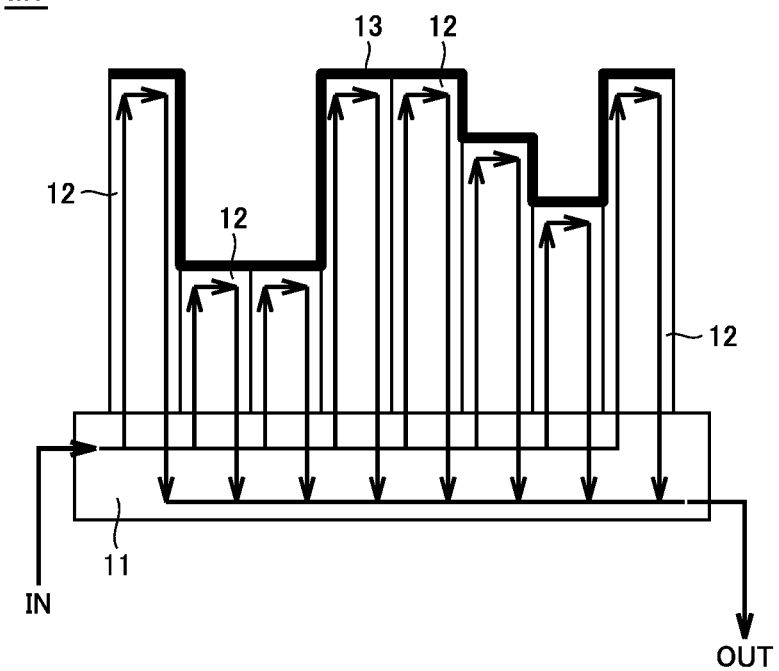

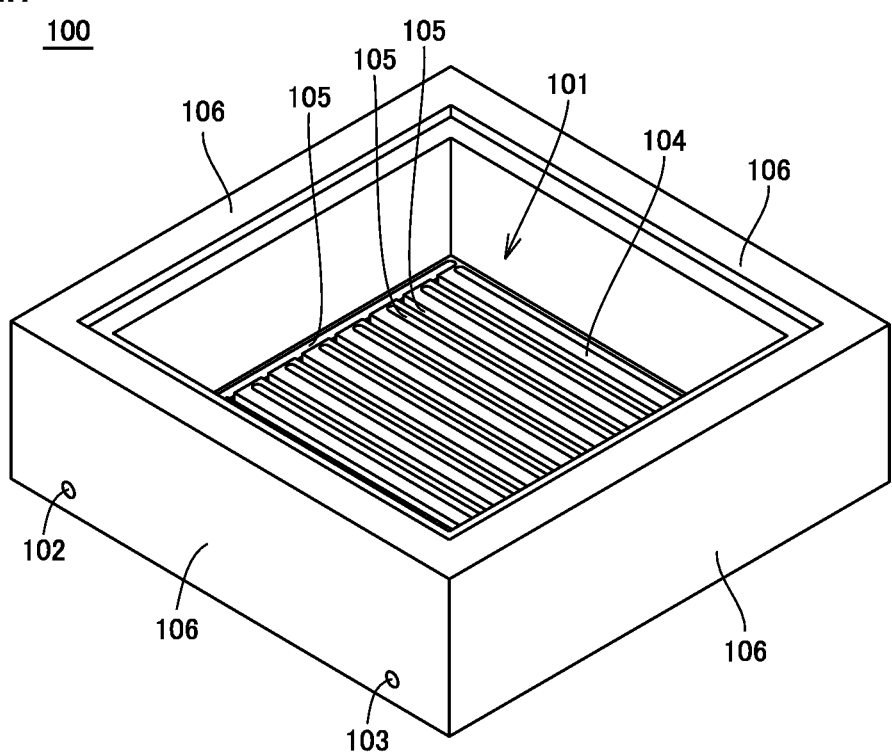

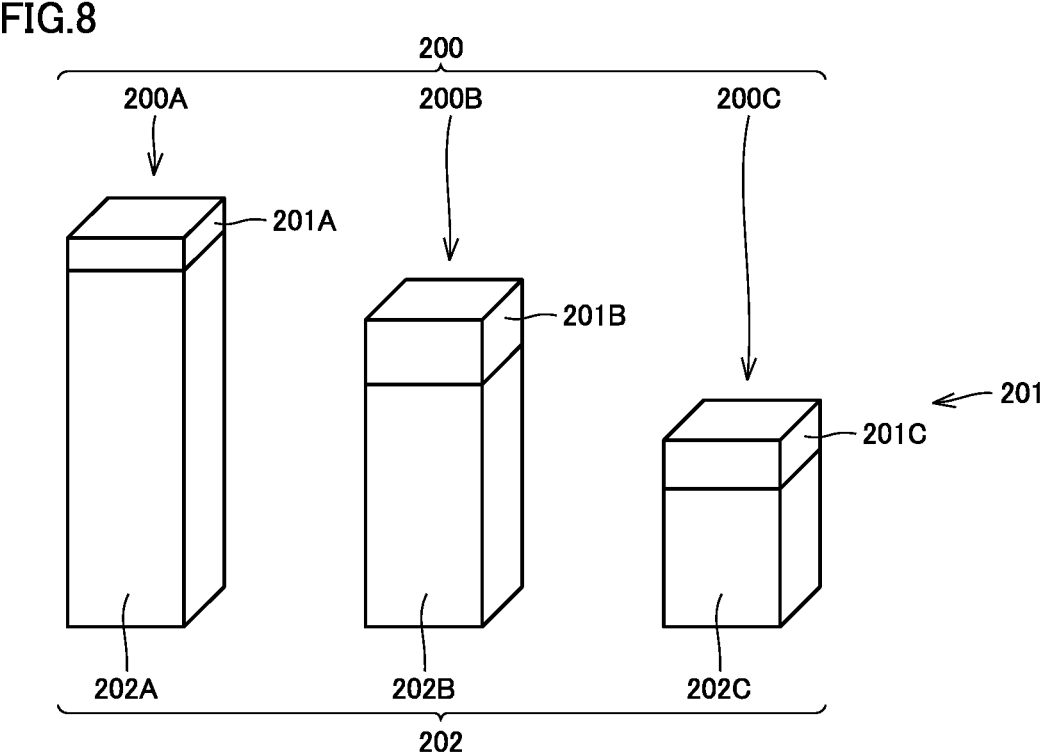

MOLD MANUFACTURING METHOD, NON-TRANSITORY COMPUTER-READABLE STORAGE MEDIUM, AND CONTROLLER

TECHNICAL FIELD

The present application relates to a mold manufacturing method for manufacturing a mold having a flow path for allowing coolant to flow in the mold, a non-transitory computer-readable storage medium, and a controller.

BACKGROUND ART

Conventionally, an additive manufacturing technology has been known. Additive manufacturing refers to a process of creating an object based on a numerical representation of a three-dimensional shape by adding a material as also described in NPL 1. In many cases, additive manufacturing is implemented by stacking a layer on another layer, and is contrast to subtractive manufacturing. It should be noted that the definition of such an additive manufacturing technology is provided in ASTM F2792-12a (Standard Terminology for Additive Manufacturing Technologies) of ASTM International, which is a private, standards development organization for industrial standards. In addition, the additive manufacturing technology is also referred to as "3D printer".

There are a plurality of processes in the additive manufacturing. It is defined that the additive manufacturing processes are roughly classified into seven processes according to the ASTM. The additive manufacturing processes include binder jetting, directed energy deposition, material extrusion, material jetting, powder bed fusion, sheet lamination, and vat photopolymerization.

PTL 1 (Japanese Patent Laying-Open No. 2002-322501) discloses a method for manufacturing a mold having a fluid path through the above-described powder bed fusion. It should be noted that the "powder bed fusion" is a process for selectively fusing a certain area provided with powder using heat energy.

CITATION LIST

Patent Literature

PTL 1: Japanese Patent Laying-Open No. 2002-322501

Non Patent Literature

NPL 1: Japan Patent Office, "Patent application technical trends surveys (Fiscal 2013): 3D printer", [online], March, 2014, [Accessed on May 20, 2016], Internet (URL: http://www.jpo.go.jp/shiryou/pdf/gidou-houkoku/25_3dprinter-.pdf)

SUMMARY OF INVENTION

Technical Problem

However, in the above-described method for manufacturing the mold in PTL 1, powder not solidified remains in the fluid path due to the use of the powder bed fusion. Accordingly, it is necessary to remove the powder after forming the mold in the method for manufacturing the mold in PTL 1. As such, loss of material is large when manufacturing a mold using the powder bed fusion.

Furthermore, in the method for manufacturing the mold in PTL 1, the process for providing the powder and the process for fusing the area provided with the powder using an optical laser need to be repeated until a desired height (thickness) is obtained. It is necessary to repeat these two processes several hundred times depending on a thickness of the mold. Accordingly, in the method for manufacturing the mold in PTL 1, it takes a very long time to manufacture the mold.

The invention of the present application has been made in view of the above-described problem, and has an object to provide: a mold manufacturing method for manufacturing a mold having a flow path for allowing coolant to flow in the mold in a short period of time while reducing loss of material; a non-transitory computer-readable storage medium storing an instruction for causing a machine tool to perform the above-described mold manufacturing method; and a controller for manufacturing the above-described mold.

Solution to Problem

According to an aspect of the present invention, a mold manufacturing method is performed to manufacture a mold having a flow path for allowing coolant to flow in the mold. The mold manufacturing method includes machining, based on a final outer shape of the mold, a workpiece including a plurality of separate components. The plurality of separate components are selected based on the outer shape, and each of all or part of the plurality of separate components is provided with a through hole for forming the flow path. The method further includes adding a material to the workpiece through an additive manufacturing technology employing directed energy deposition as an additive manufacturing process, so as to form, on a surface of the machined workpiece, a continuous surface based on the outer shape.

Preferably, in the machining, the workpiece is machined with the workpiece being fixed to a base member for forming the mold.

Preferably, a groove is provided in the base member. The groove is connected to the through hole.

Preferably, a plurality of the grooves are provided in a surface of the base member at the workpiece side. An opening of the through hole is provided at a surface of each of the components, the surface of each of the components being in contact with the base member. The grooves are connected to the through holes by fixing the components to the base member such that respective locations of the openings of the through holes coincide with respective locations of the grooves.

Preferably, an inlet of the flow path is formed in a first component of the plurality of separate components. An outlet of the flow path is formed in a second component of the plurality of separate components.

According to another aspect of the present invention, a mold manufacturing method is performed to manufacture a mold having a flow path for allowing coolant to flow in the mold. The mold manufacturing method includes machining, based on a final outer shape of the mold, a workpiece including a plurality of separate components, the machining being performed with the workpiece being accommodated in a base member for forming the mold. The plurality of separate components are selected based on the outer shape, and the plurality of separate components are arranged on a surface of the base member so as to form a space between adjacent components in order to form the flow path. The mold manufacturing method further includes adding a material to the workpiece through an additive manufacturing technology employing directed energy deposition as an additive manufacturing process, so as to form, on a surface of the machined workpiece, a continuous surface based on the outer shape.

Preferably, the base member has a bottom portion and a plurality of side portions formed on an end area of the bottom portion. A second through hole serving as an inlet of the flow path is formed in a first side portion of the plurality of side portions. A third through hole serving as an outlet of the flow path is formed in a second side portion of the plurality of side portions.

Preferably, the second side portion is located opposite to the first side portion. A plurality of the second through holes and a plurality of the third through holes are formed.

Preferably, the plurality of separate components include blocks having different sizes.

Preferably, the mold manufacturing method further includes performing surface finishing by machining to the continuous surface. The machining and the adding are performed in a machine tool.

According to still another aspect of the present invention, a non-transitory computer-readable storage medium stores an instruction for causing, when executed by a computer, at least one machine tool to perform a method for manufacturing a mold having a flow path for allowing coolant to flow in the mold. The method includes machining, based on a final outer shape of the mold, a workpiece including a plurality of separate components. The plurality of separate components are selected based on the outer shape, and each of all or part of the plurality of separate components is provided with a through hole for forming the flow path. The method further includes adding a material to the workpiece through an additive manufacturing technology employing directed energy deposition as an additive manufacturing process, so as to form, on a surface of the machined workpiece, a continuous surface based on the outer shape.

According to yet another aspect of the present invention, a non-transitory computer-readable storage medium stores an instruction for causing, when executed by a computer, at least one machine tool to perform a method for manufacturing a mold having a flow path for allowing coolant to flow in the mold. The method includes: machining, based on a final outer shape of the mold, a workpiece including a plurality of separate components, the machining being performed with the workpiece being accommodated in a base member for forming the mold. The plurality of separate components are selected based on the outer shape, and the plurality of separate components are arranged on a surface of the base member so as to form a space between adjacent components in order to form the flow path. The method further includes adding a material to the workpiece through an additive manufacturing technology employing directed energy deposition as an additive manufacturing process, so as to form, on a surface of the machined workpiece, a continuous surface based on the outer shape.

According to still another aspect of the present invention, a controller is configured to manufacture a mold having a flow path for allowing coolant to flow in the mold. The controller includes a circuit. The circuit is configured to machine, based on a final outer shape of the mold, a workpiece including a plurality of separate components. The plurality of separate components are selected based on the outer shape, and each of all or part of separate components is provided with a through hole for forming the flow path. The circuit is configured to add a material to the workpiece through an additive manufacturing technology employing directed energy deposition as an additive manufacturing process, so as to form, on a surface of the machined workpiece, a continuous surface based on the outer shape.

According to yet another aspect of the present invention, a controller is configured to manufacture a mold having a flow path for allowing coolant to flow in the mold. The controller includes a circuit. The circuit is configured to machine, based on a final outer shape of the mold, a workpiece including a plurality of separate components, the machining being performed with the workpiece being accommodated in a base member for forming the mold. The plurality of separate components are selected based on the outer shape, and the plurality of separate components are arranged on a surface of the base member so as to form a space between adjacent components in order to form the flow path. The circuit is configured to add a material to the workpiece through an additive manufacturing technology employing directed energy deposition as an additive manufacturing process, so as to form, on a surface of the machined workpiece, a continuous surface based on the outer shape.

Advantageous Effects of Invention

According to the invention, a mold having a flow path for allowing coolant to flow in the mold can be manufactured in a short period of time while reducing loss of material.

BRIEF DESCRIPTION OF DRAWINGS

FIG. 6 shows an overview of a simplified model according to the present embodiment.

FIG. 7 is a perspective view of a base member for forming a mold.

FIG. 8 is a perspective view of blocks.

DESCRIPTION OF EMBODIMENTS

Figure 1:
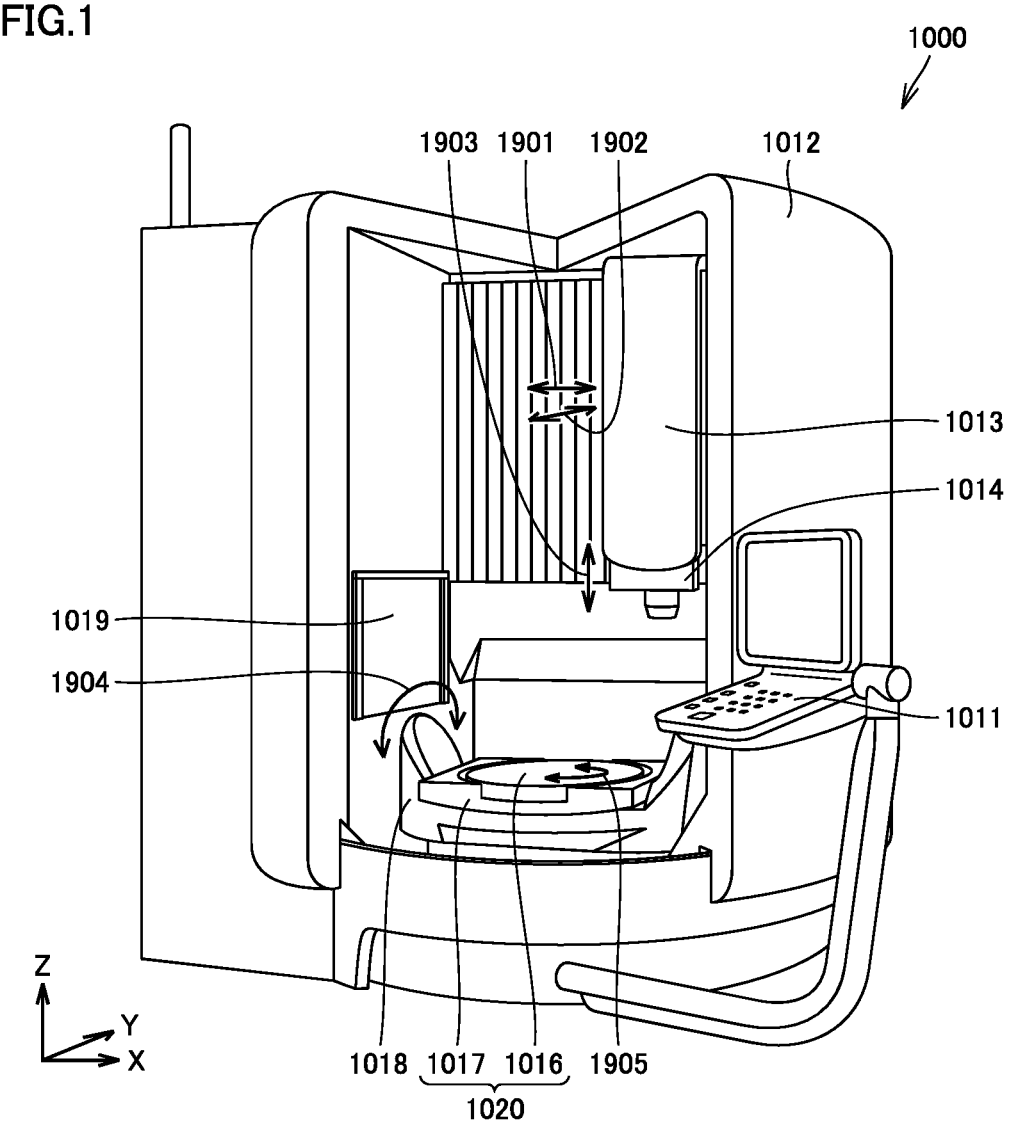
FIG. 1 is a schematic diagram for illustrating external appearance and internal structure of a machine tool.

With reference to figures, the following describes: a mold according to each embodiment of the present invention; a method for manufacturing the mold; and a machine tool for manufacturing the mold. In the description below, the same reference characters are given to the same parts. Their names and functions are also the same. Hence, they are not described in detail repeatedly. Moreover, configurations common among first to third embodiments will be described first, and configurations specific to the respective embodiments will be then described.

In the description below, a 5-axis machine having a function of additive manufacturing (i.e., 3D printer) will be illustrated as one example of the above-described machine tool. However, the machine tool is not limited to the 5-axis machine. The machine tool may be any subtractive machine (for example, 4-axis machine) having the function of the additive manufacturing technology. Furthermore, in the description below, it is assumed that directed energy deposition is used as an additive manufacturing process in additive manufacturing.

FIG. 1 is a schematic diagram for illustrating external appearance and internal structure of a machine tool 1000. With reference to FIG. 1, machine tool 1000 includes an operating system 1011, a splash guard 1012, a spindle head 1013, a spindle 1014, a rotation apparatus 1018, a door 1019, and a table apparatus 1020.

Table apparatus 1020 has a rotation table 1016 and a mount 1017 configured to rotatably support rotation table 1016. Table apparatus 1020 is attached to rotation apparatus 1018. Specifically, mount 1017 is fixed to the central portion of rotation apparatus 1018.

In the present embodiment, operating system 1011 not only serves as a conventional control panel (program editing apparatus), but also performs a function as a numerical value control apparatus. It should be noted that machine tool 1000 is not limited to such a configuration, and the numerical value control apparatus may not be provided in the housing of the laptop apparatus shown in the figure but may be provided separately in the main body of machine tool 1000.

Operating system 1011 (specifically, the numerical value control apparatus of operating system 1011) controls an overall operation of machine tool 1000 by executing a program or the like designed by a user. For example, operating system 1011 controls operations of spindle head 1013, spindle 1014, rotation apparatus 1018, door 1019, table apparatus 1020, and an additive manufacturing apparatus 1030 described later. It should be noted that operating system 1011 is a well-known system and is therefore not described herein in detail.

Spindle head 1013 is attached to a cross rail (not shown). Spindle head 1013 is provided to slidably move in an axial direction represented by an arrow 1901 (X-axis direction) and an axial direction represented by an arrow 1902 (Y-axis direction). Spindle 1014 is attached to spindle head 1013.

Spindle 1014 is provided to slidably move in an axial direction represented by an arrow 1903 (Z-axis direction). Spindle 1014 has a tip provided with a structure to which a tool holder having a tool attached thereon can be installed.

Examples of the tool holder include: additive manufacturing apparatus 1030 (FIG. 2) configured to perform additive manufacturing; and a tool holder stored in a tool magazine (not shown) (for example, a tool holder 1040 (FIG. 3) including an end mill). It should be noted that a tool holder other than additive manufacturing apparatus 1030 is attached to spindle 1014 by an automatic tool changer 1021 (FIG. 3).

The tool magazine is disposed opposite to a machining area relative to door 1019 (i.e., disposed behind door 1019 in FIG. 1). It should be noted that the term "machining area" refers to a space (internal space of machine tool 1000) which is partitioned by splash guard 1012 and door 1019 and in which spindle head 1013, spindle 1014, rotation apparatus 1018, table apparatus 1020, additive manufacturing apparatus 1030, a workpiece, and the like are movably placed.

Each of spindle head 1013 and spindle 1014 is appropriately provided with a feed structure, a guidance structure, a servo motor, and the like to enable the slide motion thereof. In machine tool 1000, respective slide motions of spindle head 1013 and spindle 1014 can be combined to freely change the position of the tool attached to the tool holder in the XYZ space.

Rotation apparatus 1018 is provided to be rotatable through motor driving with respect to a center axis extending in the X-axis direction. Rotation of rotation apparatus 1018 causes table apparatus 1020 to rotate clockwisely and counterclockwisely (direction represented by an arrow 1904) with respect to the center axis.

In a default state as shown in FIG. 1, rotation table 1016 of table apparatus 1020 is provided to be rotatable through motor driving with respect to the center axis extending in the vertical (Z-axis) direction. It should be noted that since rotation table 1016 is rotated in the direction of arrow 1904 by rotation apparatus 1018, the center axis of rotation of rotation table 1016 is changed while being maintained to be in parallel with the YZ plane.

On rotation table 1016, a workpiece is held using a chuck or various types of jigs. During cutting with a stationary tool, rotation table 1016 is rotated to cause the workpiece to rotate clockwisely and counterclockwisely (direction of arrow 1905) with respect to the center axis.

With the configuration described above, machine tool 1000 is capable of changing a posture of a member, such as a workpiece, placed in the machining area.

Figure 2:
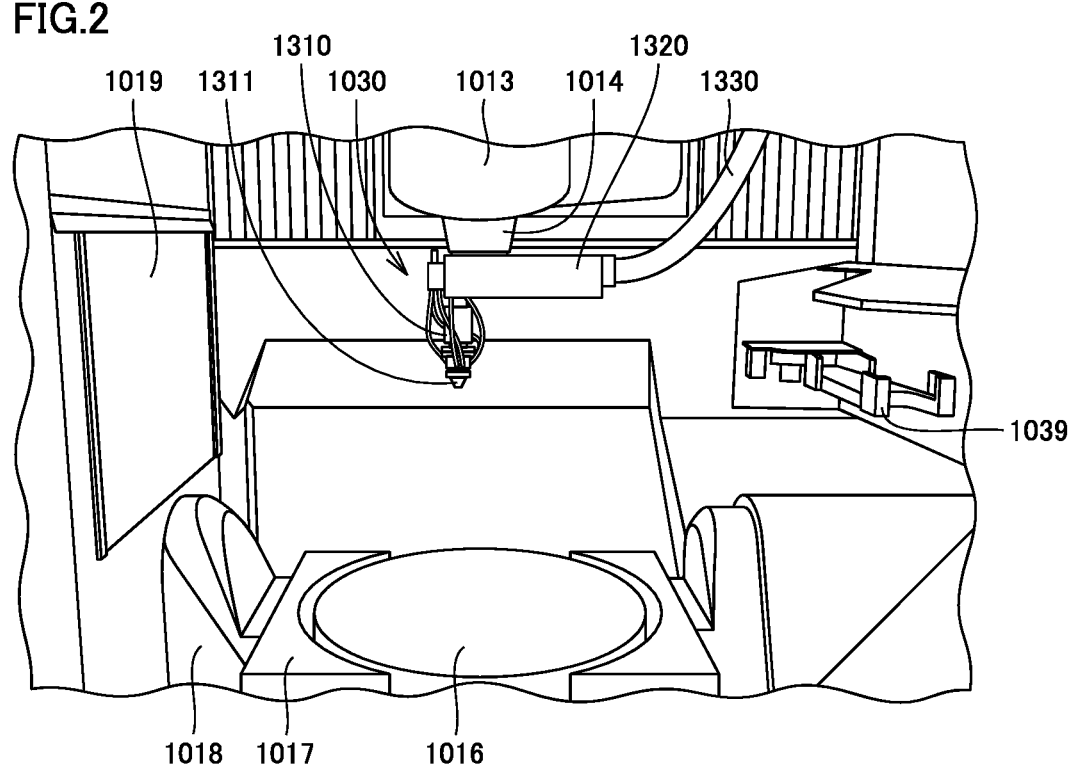
FIG. 2 shows a state in which an additive manufacturing apparatus is attached to a spindle.
Figure 3:
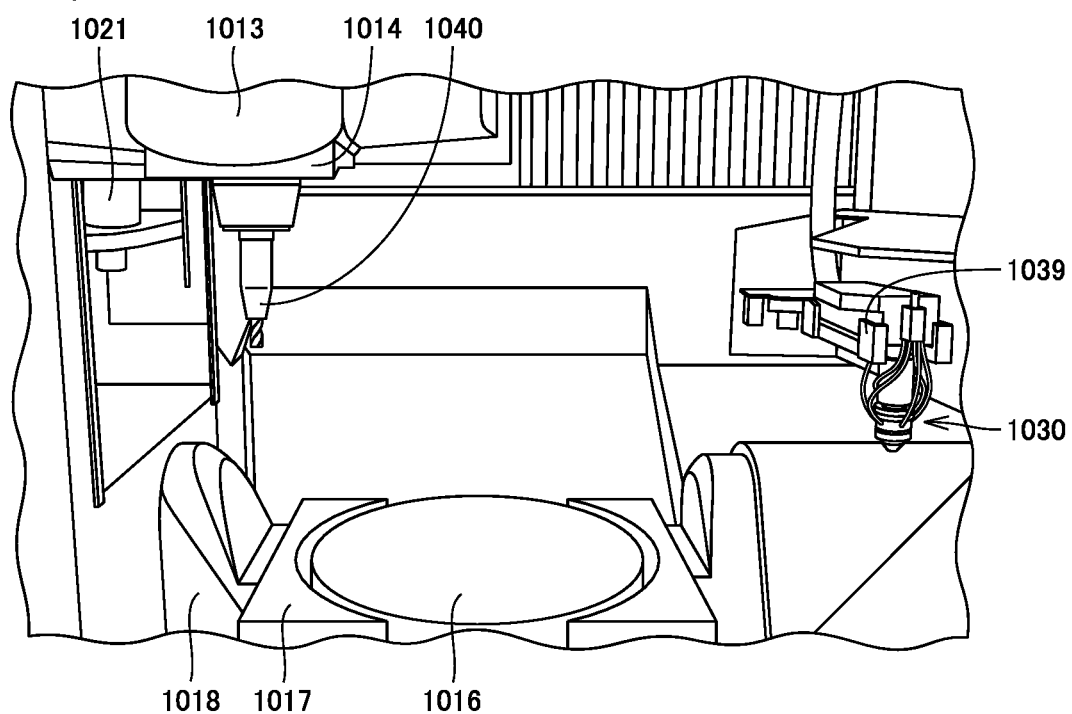
FIG. 3 shows a state in which a tool holder is attached to the spindle.

FIG. 2 shows a state in which additive manufacturing apparatus 1030 is attached to spindle 1014. With reference to FIG. 2, additive manufacturing apparatus 1030 includes an application unit 1310, an attachment unit 1320, and a hose unit 1330.

Although details will be described later, metal powders or the like are applied from tip 1311 of application unit 1310. Attachment unit 1320 is a member for fixing additive manufacturing apparatus 1030 to spindle 1014. Hose unit 1330 is a supply path of the powders or the like. Hose unit 1330 is provided to supply the powders or the like from an apparatus (not shown) having the powders or the like stored therein to application unit 1310 via attachment unit 1320.

When additive manufacturing apparatus 1030 is not used, machine tool 1000 stores additive manufacturing apparatus 1030 in a holder 1039 for the additive manufacturing apparatus. It should be noted that holder 1039 is configured to be rotatable while maintaining to be in parallel with the XY plane. That is, holder 1039 is rotated with respect to an axis parallel to the Z axis.

FIG. 3 shows a state in which tool holder 1040 is attached to spindle 1014. With reference to FIG. 3, operating system 1011 performs control to open door 1019, and then causes the automatic tool changer to attach tool holder 1040 to spindle 1014. It should be noted that tool holder 1040 is exchanged in a state in which additive manufacturing apparatus 1030 is stored in holder 1039.

Figure 4:
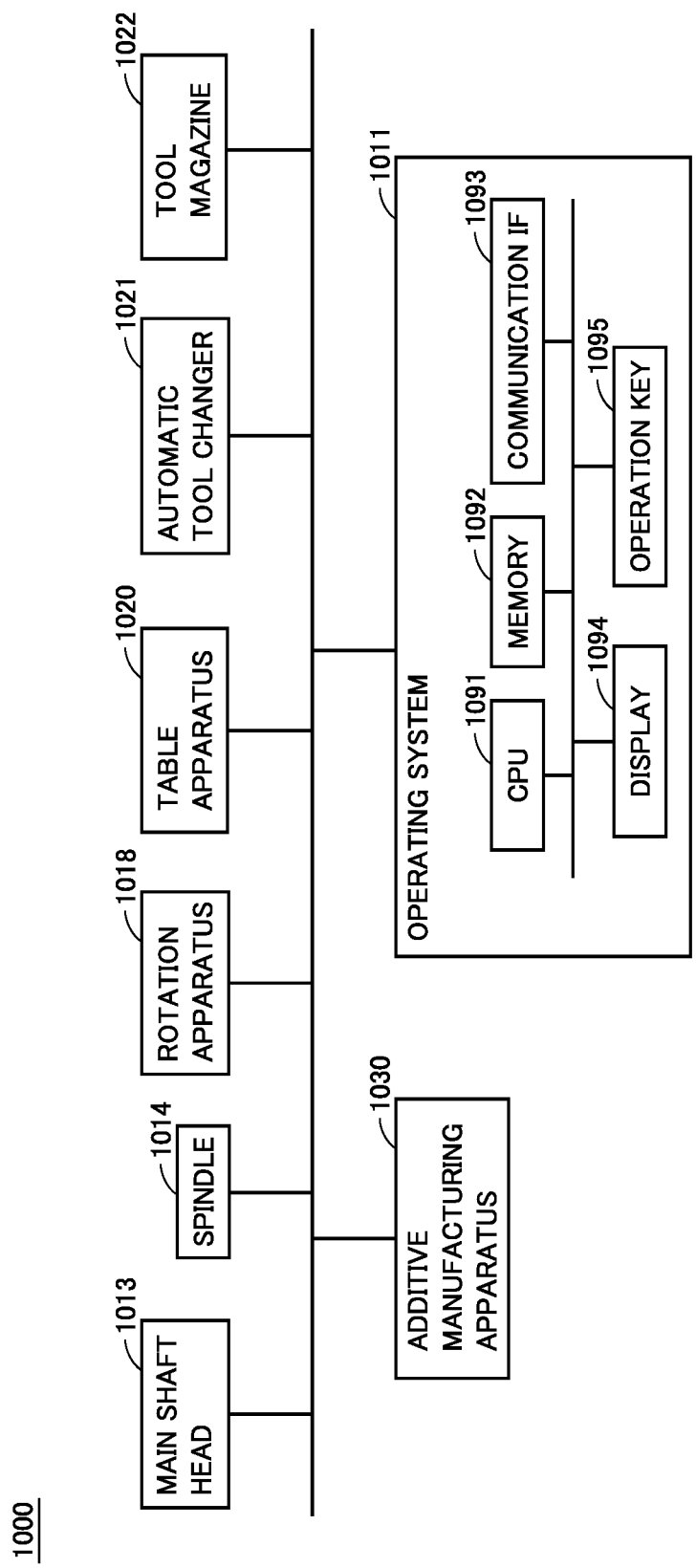
FIG. 4 shows an overview of a hardware configuration of the machine tool.

FIG. 4 shows an overview of a hardware configuration of machine tool 1000. With reference to FIG. 4, machine tool 1000 includes operating system 1011, spindle head 1013, spindle 1014, rotation apparatus 1018, table apparatus 1020, automatic tool changer 1021, tool magazine 1022, and additive manufacturing apparatus 1030.

Operating system 1011 has a CPU (Central Processing Unit) 1091, a memory 1092, a communication IF (Interface) 1093, a display 1094, and an operation key 1095.

CPU 1091 executes various types of programs stored in memory 1092, thereby controlling respective operations of units of machine tool 1000 via communication IF 1093. Display 1094 displays various types of information in machine tool 1000 such that the user of machine tool 1000 can visually recognize the information. Operation key 1095 receives various inputs (for example, inputs of starting machining) provided by the user.

Figure 5:
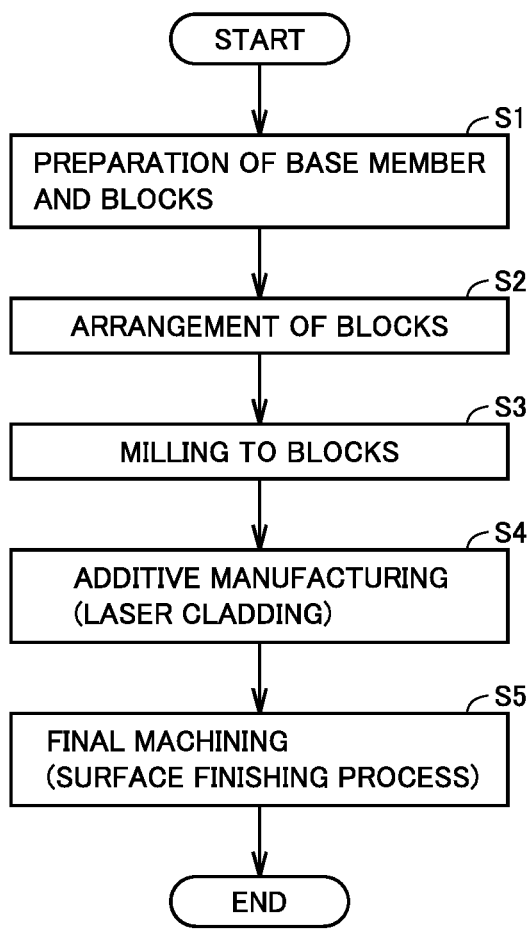
FIG. 5 is a flowchart showing a flow of a process when manufacturing a mold.

FIG. 5 is a flowchart showing a flow of a process when manufacturing a mold. With reference to FIG. 5, a base member and blocks are prepared in a step S1. Specifically, the base member and the blocks are prepared based on a final outer shape of the mold. More specifically, one base member is selected from a plurality of types of base members, and at least one or more types of blocks are selected from a plurality of types of blocks. These selection processes may be performed by a human being, or may be performed automatically by a predetermined application program.

Moreover, the base member and the blocks may be prepared automatically by machine tool 1000. Specifically, the base member and the blocks may be automatically sent to a machining area of machine tool 1000.

In a step S2, the blocks are arranged on the base member. Typically, the plurality of separate blocks (hereinafter, also simply referred to as "plurality of blocks") are fixed on the base member. A method for fixing them is not particularly limited. The plurality of blocks may be fixed by way of fastening using a bolt (for example, fixation by passing the bolt from the backside surface of the base member into a block), or by way of engagement with the base member (for example, engagement between protrusions of the base member and recesses of the blocks).

Moreover, the blocks may be arranged by a user, or may be arranged by machine tool 1000. In the configuration in which the blocks are arranged on the base member by machine tool 1000, machine tool 1000 needs to include a structure for holding the blocks and conveying the blocks to predetermined locations of the base member.

In a step S3, milling (cutting) is performed onto the blocks by machine tool 1000 as machining. Specifically, based on the final shape of the mold, milling is performed by machine tool 1000. More specifically, machine tool 1000 performs milling onto the plurality of blocks using data input by the user (data based on the final shape of the mold). Further specifically, the machining is performed in the following manner: a workpiece including the plurality of blocks is machined with the plurality of blocks being fixed to the base member for forming the mold (specifically, all or part of the plurality of blocks are machined). It should be noted that not only the plurality of blocks but also the base member may be machined.

In a step S4, machine tool 1000 performs additive manufacturing (laser cladding; 3D printing). Specifically, machine tool 1000 performs additive manufacturing onto a predetermined area including the surface machined by the milling. More specifically, in order to form, on surfaces of the milled blocks (workpiece), a continuous surface based on the final outer shape of the mold, machine tool 1000 adds a material (metal powders) onto the blocks through an additive manufacturing technology employing the directed energy deposition as the additive manufacturing process.

In a step S5, machine tool 1000 performs final machining at least onto the formed continuous surface. Specifically, machine tool 1000 performs a surface finishing process onto the continuous surface. It should be noted that an instruction for performing the final process is stored in machine tool 1000 by the user.

Meanwhile, structures of the blocks and the base member differ depending on respective embodiments described below. For example, in each of the first and second embodiments, a flow path for allowing coolant to flow is formed in the blocks. Specifically, in each of the first and second embodiments, a through hole for allowing coolant to flow is provided. On the other hand, in the third embodiment, no flow path is formed in the blocks. Details of other differences will be described later.

Moreover, in each of the below-described embodiments, characteristic configurations of molds (molds 1C, 2, 3C) to be obtained in the respective embodiments will be straightforwardly described using simplified models (M1, M2, M3) different from the molds in terms of outer and cross sectional shapes before explaining specific and detailed configurations of the molds, specific and detailed methods for manufacturing the molds, and the like.

First Embodiment

A. Overview (Simplified Model)

FIG. 6 shows an overview of simplified model M1 according to the present embodiment. With reference to FIG. 6, in simplified model M1, a plurality of blocks 12 are arranged on base member 11. Moreover, on exposed surfaces (upper and side surfaces) of blocks 12, a metal layer 13 is formed by additive manufacturing.

Moreover, each of all the plurality of blocks 12 (plurality of separate components) is provided with a through hole for forming a flow path for allowing coolant to flow therein. Moreover, base member 11 is provided with grooves (for details, see grooves 105 of base member 100 in FIG. 7) for forming the flow path for allowing coolant to flow. The grooves of base member 11 are connected to the through holes of blocks 12.

Specifically, the plurality of grooves are provided in a surface of the base member at the block side. Openings of the through holes are provided in the surfaces of the blocks in contact with the base member. By fixing the blocks to the base member such that the locations of the grooves of the base member coincide with the locations of the openings of the through holes of the blocks, the grooves of the base member are connected to the through holes of the blocks.

The coolant enters base member 11, then flows in each block 12, and flows out of base member 11. In each block 12, the coolant supplied from base member 11 returns to base member 11 without flowing into the other blocks 12.

Specifically, base member 11 is provided with: a flow path (specifically, a through hole) for allowing the coolant to flow to each block 12; and a flow path (specifically, a through hole) for allowing the coolant from block 12 to flow to outside. Each of the plurality of blocks 12 is provided with: an inlet for allowing the coolant from base member 11 to flow into block 12; and an outlet for returning the coolant to base member 11.

More specifically, in order to increase an effect of cooling metal layer 13 by the coolant, the flow path is formed also near metal layer 13 in each block 12.

The following describes: a detailed configuration of the mold having such a characteristic configuration; and a process for manufacturing the mold.

B. Details of Manufacturing Process and Mold b1. Preparation of Base Member and Blocks

The following specifically describes preparation (corresponding to step S1 of FIG. 5) of the base member and blocks.

FIG. 7 is a perspective view of a base member 100 for forming a mold. With reference to FIG. 7, base member 100 is constituted of a bottom portion 104 and four side portions 106 surrounding bottom portion 104. An accommodation portion 101 is constituted of bottom portion 104 and four side portions 106. One of four side portions 106 is provided with through holes 102, 103. Moreover, a plurality of grooves 105 are provided in a main surface of bottom portion 104.

FIG. 8 is a perspective view of blocks. With reference to FIG. 8, when manufacturing a mold, blocks having different sizes (typically, heights) are used. Specifically, a plurality of blocks are arranged in accommodation portion 101 of base member 100. With reference to FIG. 8, various types of blocks such as blocks 200A, 200B, 200C are arranged in accommodation portion 101.

Block 200A is constituted of a main body portion 202A and a cap portion 201A. Specifically, block 200A is formed by engaging cap portion 201A with main body portion 202A. Similarly, block 200B is constituted of a main body portion 202B and a cap portion 201B. Block 200C is constituted of a main body portion 202C and a cap portion 201C.

Typically, each of blocks 200A, 200B, 200C has a rectangular parallelepiped outer shape. The shapes of the bottom surfaces of blocks 200A, 200B, 200C are the same. Moreover, the heights (lengths) of main body portions 202A, 202B, 202C are different from one another. The thicknesses (heights of the blocks in the height direction) of cap portions 201A, 201B, 201C may be the same or may be different from one another.

It should be noted that in the description below, the various types of blocks such as blocks 200A, 200B, 200C will be collectively referred to as "block 200". Moreover, the various types of main body portions such as main body portions 202A, 202B, 202C will be collectively referred to as "main body portion 202". Moreover, the various types of cap portions such as cap portions 201A, 201B, 201C will be collectively referred to as "cap portion 201".

Figure 9A:
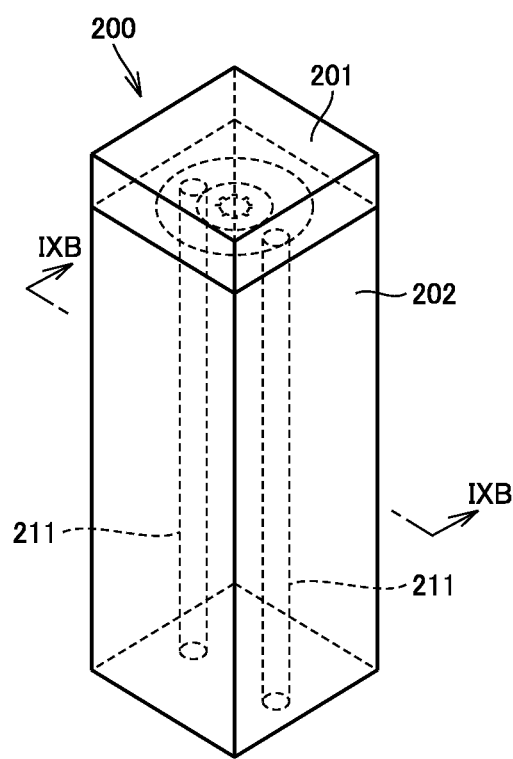
FIG. 9A is a transparent view of an internal structure of each block.
Figure 9B:
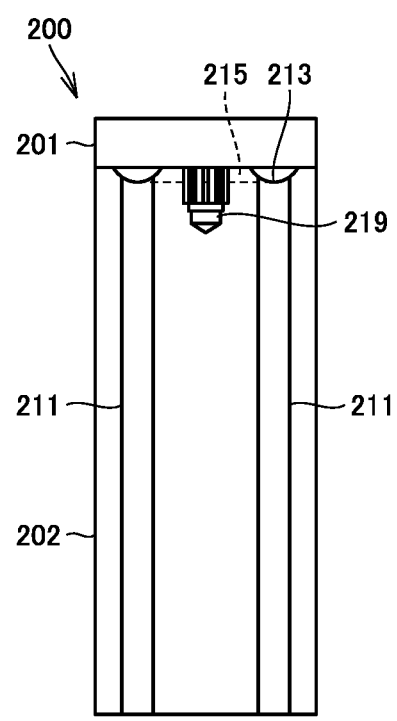
FIG. 9B is a cross sectional view taken along a line IXB-IXB in FIG. 9A.
Figure 9C:
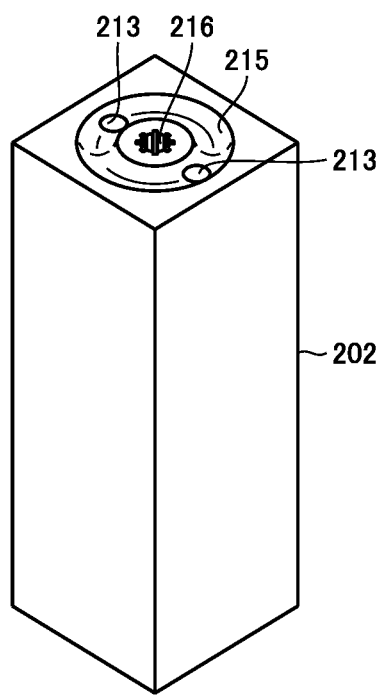
FIG. 9C is a perspective view of a main body portion.

FIGS. 9A, 9B, and 9C illustrate details of block 200. FIG. 9A is a transparent view of an internal structure of block 200. FIG. 9B is a cross sectional view taken along a line IXB-IXB in FIG. 9A. FIG. 9C is a perspective view of main body portion 202.

With reference to FIGS. 9A and 9B, two through holes 211 are provided in main body portion 202. Moreover, with reference to FIG. 9B, cap portion 201 has a protrusion 219 serving as a member for fixing cap portion 201 to main body portion 202. With reference to FIG. 9C, a half-doughnut shaped recess 215 is formed in the upper end of main body portion 202. Moreover, in the surface of recess 215, respective openings 213 of two through holes 211 are formed. Furthermore, a hole 216 into which protrusion 219 of cap portion 201 is to be inserted is provided at the central portion of the upper end of main body portion 202.

It should be noted that the configuration of the upper end of main body portion 202 is not limited to such a configuration. The configuration of the upper end of main body portion 202 is not limited particularly as long as cap portion 201 can be fixed and the coolant sent from one through hole 211 can be sent to the other through hole 211.

Figure 10:
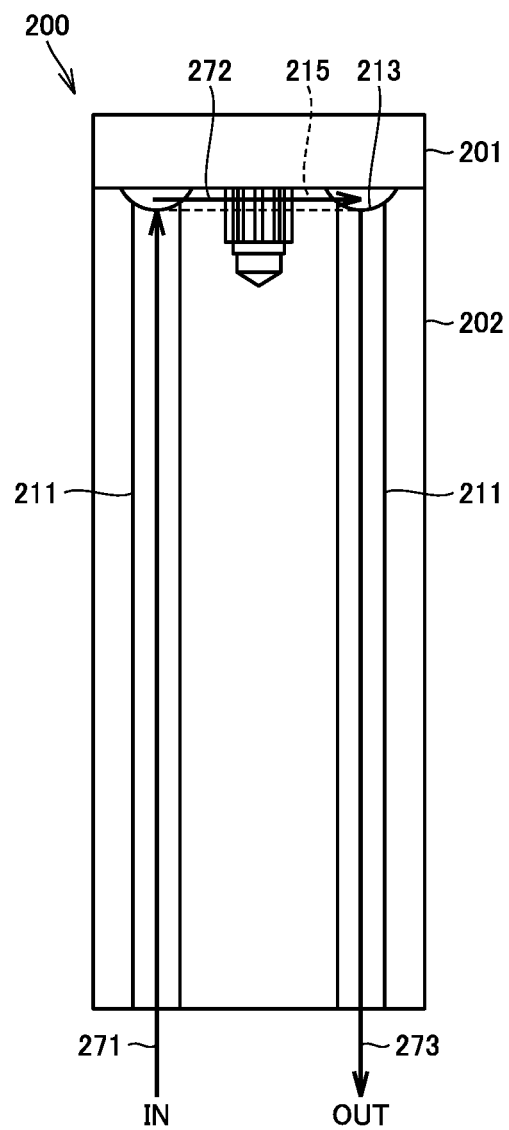
FIG. 10 is a cross sectional view for illustrating flow of coolant in the block.

FIG. 10 is a cross sectional view for illustrating flow of the coolant in block 200. Specifically, FIG. 10 is a figure obtained by adding arrows indicating the flow of the coolant to FIG. 9B.

With reference to FIG. 10, the coolant sent from base member 100 passes, in a direction of arrow 271, through one through hole 211 provided in main body portion 202. Then, the coolant passes through recess 215 of main body portion 202 in a direction of arrow 272. Further, the coolant passes, in a direction of arrow 273, through the other through hole 211 provided in main body portion 202, and then is sent to base member 100.

Recess 215 of main body portion 202 is covered with cap portion 201. Hence, the coolant is also in contact with the bottom surface of cap portion 201. Accordingly, not only main body portion 202 but also cap portion 201 are directly cooled by the coolant.

b2. Arrangement of Blocks

The following specifically describes an arrangement of the blocks (corresponding to step S2 of FIG. 5).

Figure 11:
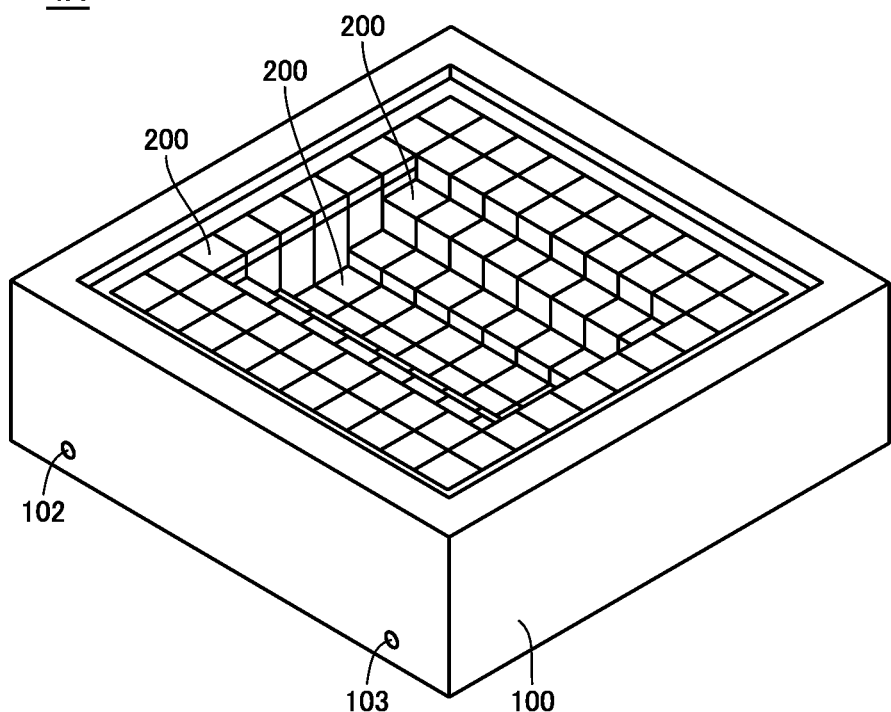
FIG. 11 shows an external appearance of an intermediate member obtained by arranging the plurality of blocks on the base member.

FIG. 11 shows an external appearance of an intermediate member 1A obtained by arranging the plurality of blocks 200 on base member 100. With reference to FIG. 11, blocks 200 selected based on the final outer shape of the mold are arranged in accommodation portion 101 of base member 100 based on the outer shape.

Specifically, blocks 200 are arranged in accommodation portion 101 with cap portions 201 facing upward. More specifically, blocks 200 are arranged on bottom portion 104 with the respective side surfaces of blocks 200 being in contact with one another such that the surface of bottom portion 104 is unseen.

b3. Milling

The following specifically describes milling (corresponding to step S3 of FIG. 5).

Figure 12:
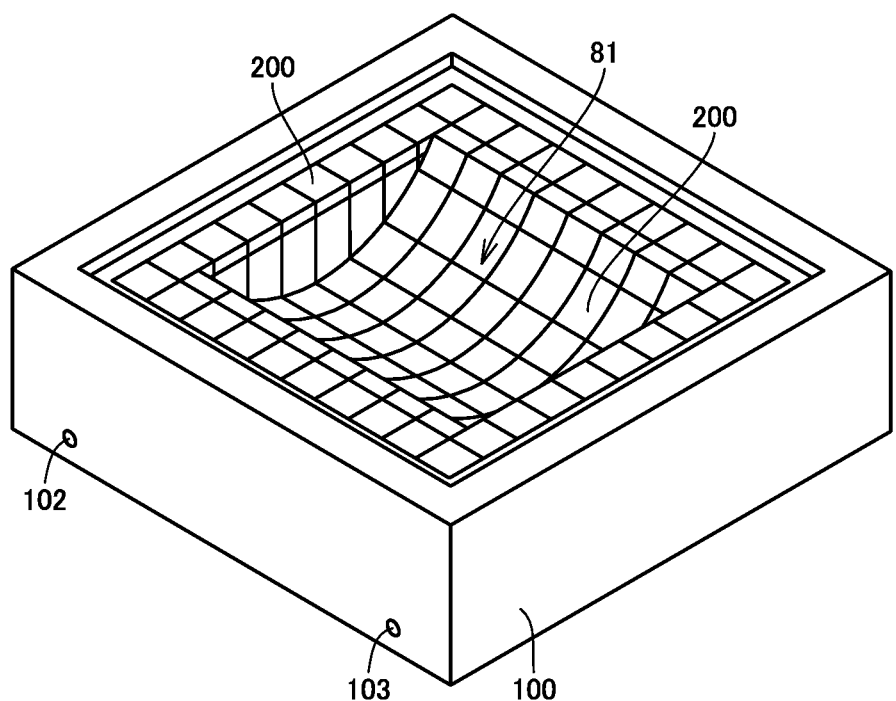
FIG. 12 shows an external appearance of an intermediate member obtained by milling the foregoing intermediate member.

FIG. 12 shows an external appearance of an intermediate member 1B obtained by milling intermediate member 1A. With reference to FIG. 12, by milling cap portions 201 of the plurality of blocks 200, intermediate member 1B having a curved surface 81 close to the final shape of the mold is obtained. It should be noted that a portion of main body portion 202 may be cut as long as through holes 211 are not exposed.

b4. Additive Manufacturing and Final Machining

The following specifically describes additive manufacturing and final machining (corresponding to steps S4, S5 of FIG. 5).

Figure 13:
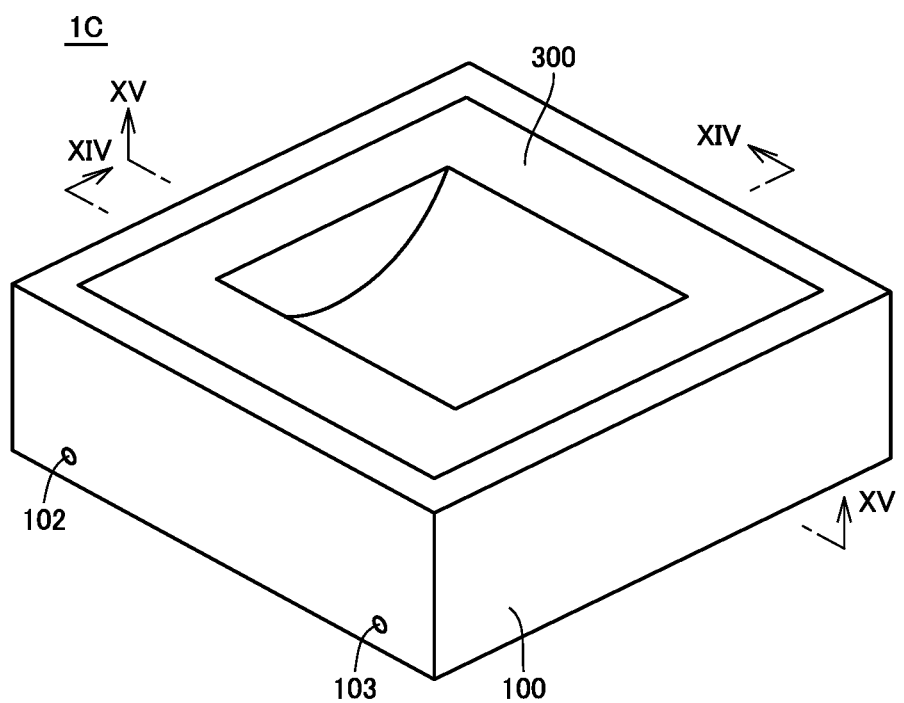
FIG. 13 shows an external appearance of a mold obtained by performing additive manufacturing and final machining to the intermediate member.

FIG. 13 shows an external appearance of mold 1C obtained by performing the additive manufacturing and the final machining to intermediate member 1B. With reference to FIG. 13, additive manufacturing apparatus 1030 of machine tool 1000 is used to perform the additive manufacturing to at least the exposed surfaces of milled blocks 200 (cap portions 201 and side surfaces of part of main body portions 202). Further, as the final machining, machine tool 1000 performs a surface finishing process to metal layer 300 formed by the additive manufacturing. By such a process, mold 1C serving as a final product is obtained. In mold 1C, all the blocks 200 are covered with metal layer 300.

It should be noted that in the additive manufacturing process, metal layer 300 is formed to coincide with the final shape of the mold. That is, the material is added to the blocks 200 along the shapes of the exposed surfaces of milled blocks 200 so as to coincide with the final shape of the mold.

Figure 14:
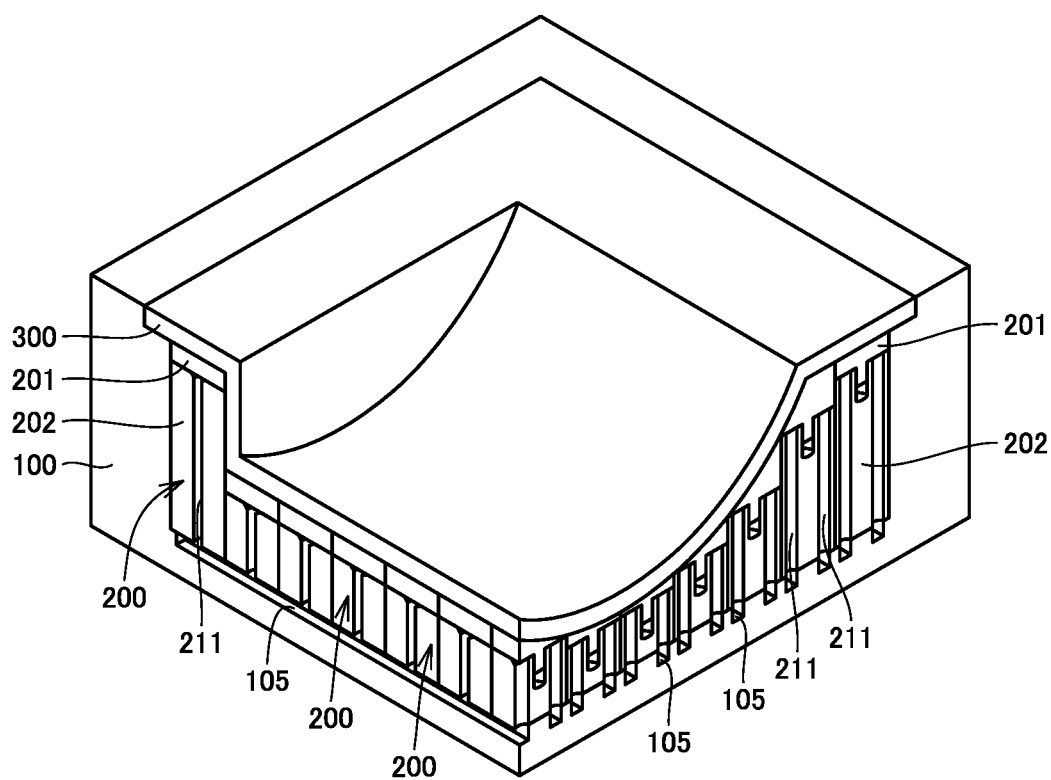
FIG. 14 is a cross sectional view taken along a line XIV-XIV in FIG. 13.

FIG. 14 is a cross sectional view taken along a line XIV-XIV in FIG. 13. With reference to FIG. 14, in mold 1C, the plurality of blocks 200 are embedded between base member 100 and metal layer 300. Moreover, the flow path for allowing the coolant to flow is formed entirely inside mold 1C by the plurality of grooves 105 of base member 100 and two through holes 211 of each of the plurality of blocks 200.

Figure 15:
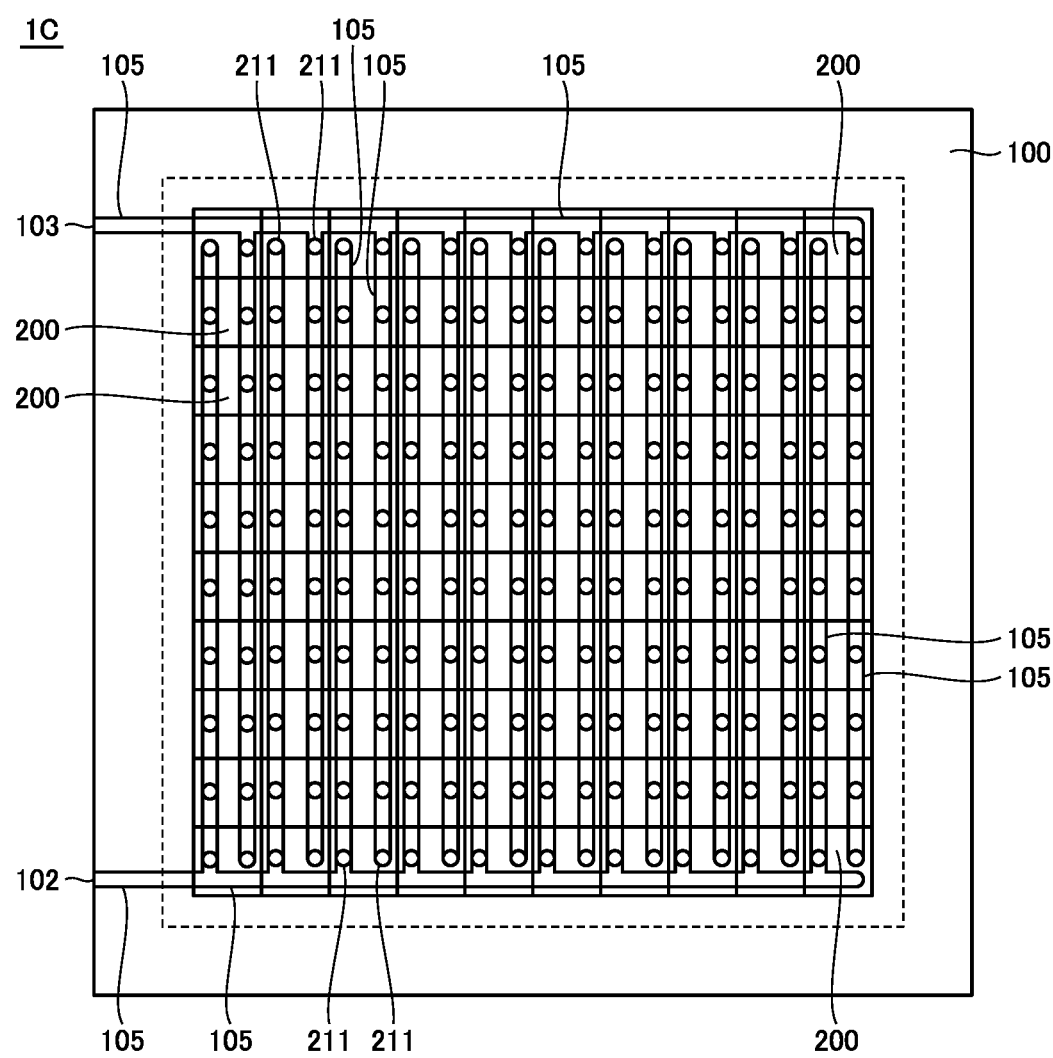
FIG. 15 is a cross sectional view taken along a line XV-XV in FIG. 13.

FIG. 15 is a cross sectional view taken along a line XV-XV in FIG. 13. With reference to FIG. 15, base member 100 is provided with through hole 102, through hole 103, and the plurality of grooves 105. Each of the plurality of blocks 200 is provided with two through holes 211. Grooves 105 are roughly classified into: grooves 105 connected to through hole 102; and grooves 105 connected to through hole 103. Each of blocks 200 is arranged in accommodation portion 101 of base member 100 such that through holes 211 (specifically, the openings of through holes 211) of blocks 200 are located just above grooves 105.

Figure 16:
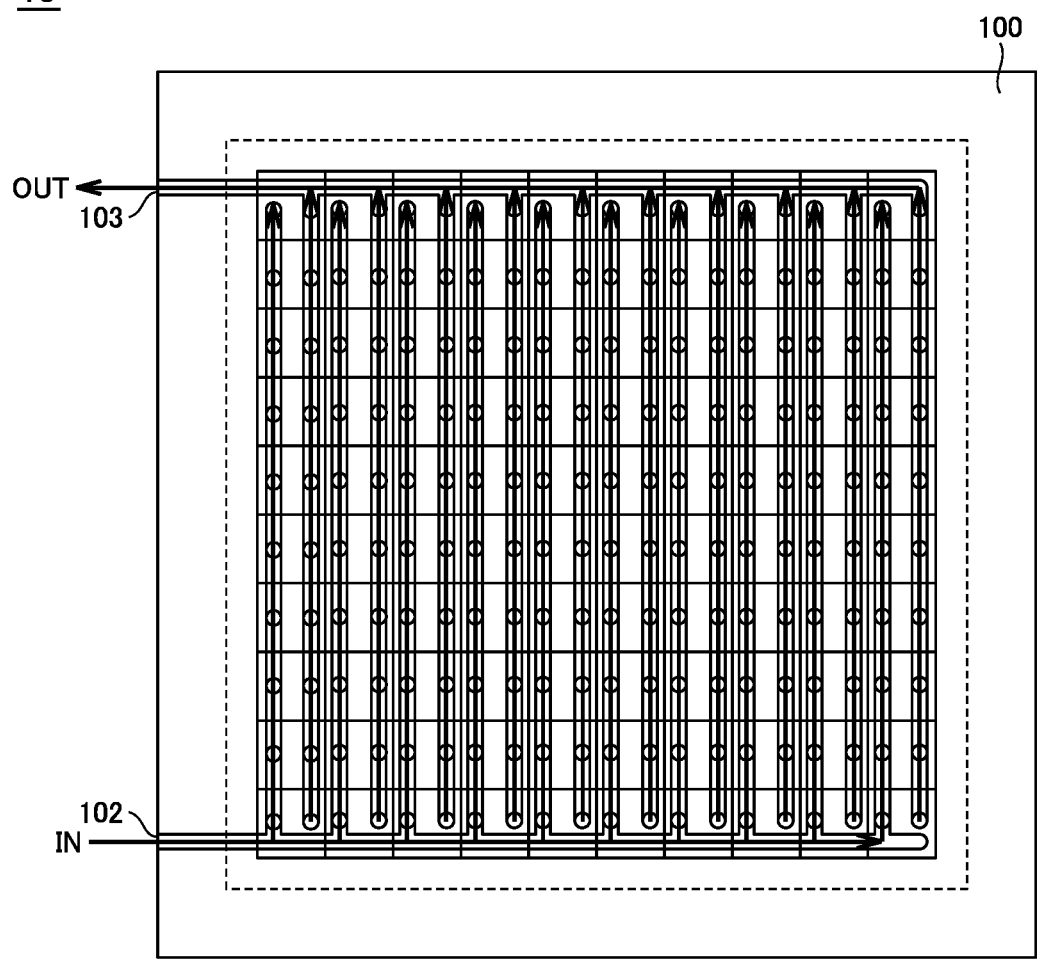
FIG. 16 is a cross sectional view for illustrating flow of coolant.

FIG. 16 is a cross sectional view for illustrating the flow of the coolant. Specifically, FIG. 16 is a figure obtained by adding arrows indicating the flow of the coolant to FIG. 15. With reference to FIG. 16, in mold 1C, the coolant enters from through hole 102, passed through groove 105, and then passes through through hole 211 of each block 200 as described above. Then, the coolant passes through groove 105 different from the foregoing groove 105 through which the coolant has passed, and then flows out of through hole 103.

C. Conclusion (1) The above-described mold manufacturing method is performed to manufacture a mold 1C having a flow path for allowing coolant to flow in mold 1C. The mold manufacturing method includes machining, based on a final outer shape of mold 1C, a workpiece including a plurality of separate blocks 200. The plurality of separate blocks 200 are selected based on the outer shape, and each of all of the plurality of separate blocks 200 is provided with a through hole 211 for forming the flow path. The mold manufacturing method further includes adding a material to the workpiece through an additive manufacturing technology employing directed energy deposition as an additive manufacturing process, so as to form, on a surface of the milled workpiece, a continuous surface based on the outer shape.

According to the above-described mold manufacturing method, loss of material can be reduced as compared with a configuration employing the powder bed fusion as the additive manufacturing process. Moreover, since the plurality of blocks 200 are used, it is possible to reduce a period of time of manufacturing the mold as compared with the configuration employing the powder bed fusion. Thus, according to the mold manufacturing method according to the present embodiment, a mold having a flow path for allowing coolant to flow in the mold can be manufactured in a short period of time while reducing loss of material.

It should be noted that through holes 211 may be provided in only part of the plurality of separate blocks. That is, in manufacturing the mold, in addition to blocks 200 provided with through holes 211, blocks each provided with no through hole may be partially used.

(2) Further, in the machining, the workpiece is machined with the workpiece being fixed to a base member 100 for forming mold 1C.

(3) A groove 105 is provided in base member 100. Groove 105 is connected to the through hole. According to such a configuration, the flow path for the coolant is formed.

(4) Specifically, a plurality of grooves 105 are provided in a surface of base member 100 at the workpiece side. An opening of through hole 211 is provided at a surface of each of blocks 200, the surface of each of blocks 200 being in contact with base member 100. Grooves 105 are connected to through holes 211 by fixing blocks 200 to base member 100 such that respective locations of the openings of through holes 211 coincide with respective locations of grooves 105.

(5) The plurality of separate blocks 200 include blocks having different sizes. According to such a configuration, mold 1C can be manufactured efficiently as compared with a case where the sizes of the blocks are the same.

(6) The mold manufacturing method further includes performing surface finishing by the machining to the continuous surface. The machining and the adding are performed in a machine tool. According to such a configuration, a period of time required to manufacture the mold can be shortened as compared with a case where the machining and the adding are performed in separate apparatuses.

D. Modification

The base member may be configured to be provided with through holes instead of grooves 105. More specifically, explanation will be made as follows.

Base member 100 is provided with through holes. It can be said that the through holes are obtained by extending through holes 102, 103. In the surface of base member 100 at the block 200 side, openings of the through holes are provided. The through holes of base member 100 are connected to the through holes of blocks 200 by fixing the plurality of blocks 200 to base member 100 such that the respective locations of the openings of the through holes of blocks 200 (openings at the base member 100 side) coincide with the respective locations of the openings of the through holes of base member 100. That is, shapes similar to those of grooves 105 are formed in base member 100, and openings are formed in the surface of base member 100 at the block 200 side to communicate with blocks 200.

Also with such a configuration, the same effect as that for mold 1C can be obtained.

Second Embodiment

E. Overview (Simplified Model)

Figure 17:
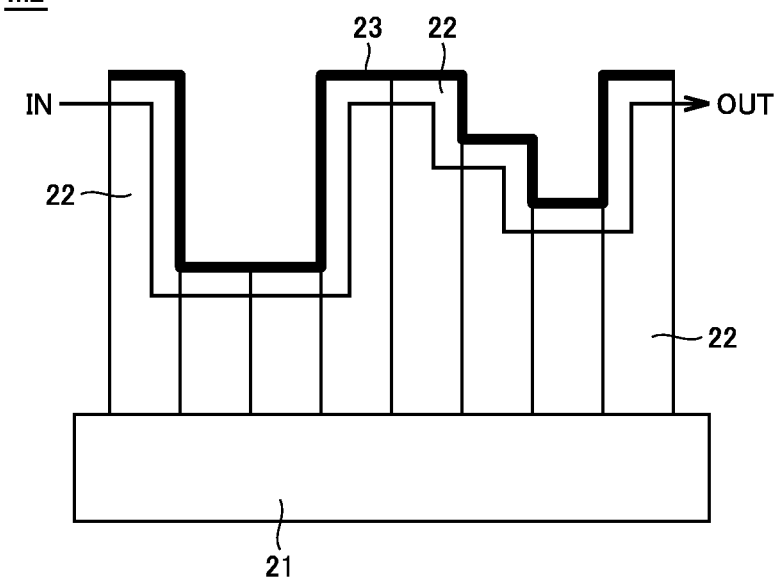
FIG. 17 shows an overview of a simplified model according to another embodiment.

FIG. 17 shows an overview of simplified model M2 according to the present embodiment. With reference to FIG. 17, in simplified model M2, a plurality of blocks 22 are arranged on a base member 21. Moreover, on exposed surfaces (upper and side surfaces) of blocks 22, a metal layer 23 is formed by additive manufacturing.

Moreover, each of all the plurality of blocks 22 (plurality of separate components) is provided with a through hole for forming a flow path for allowing coolant to flow therein. It should be noted that in the present embodiment, unlike the first embodiment, base member 21 is not provided with grooves for forming a flow path for allowing coolant to flow.

Specifically, a through hole of a block 22 is connected to a through hole of an adjacent block 22. Typically, each block 22 is provided with two openings of the through hole in side surfaces thereof. The plurality of blocks are arranged such that one opening of a block 22 overlaps with one opening of an adjacent block and the other opening of block 22 overlaps with one opening of the other adjacent block.

The coolant enters a block 22 located at an end among the plurality of blocks 22, passes through the through holes of the plurality of blocks 22, and flows out of a block 22 located at the other end. More specifically, in order to increase an effect of cooling metal layer 13 by the coolant, the flow path is formed also near metal layer 23 in each block 22.

The following describes: a detailed configuration of the mold having such a characteristic configuration; and a process for manufacturing the mold.

F. Details of Manufacturing Process and Mold

Figure 18:
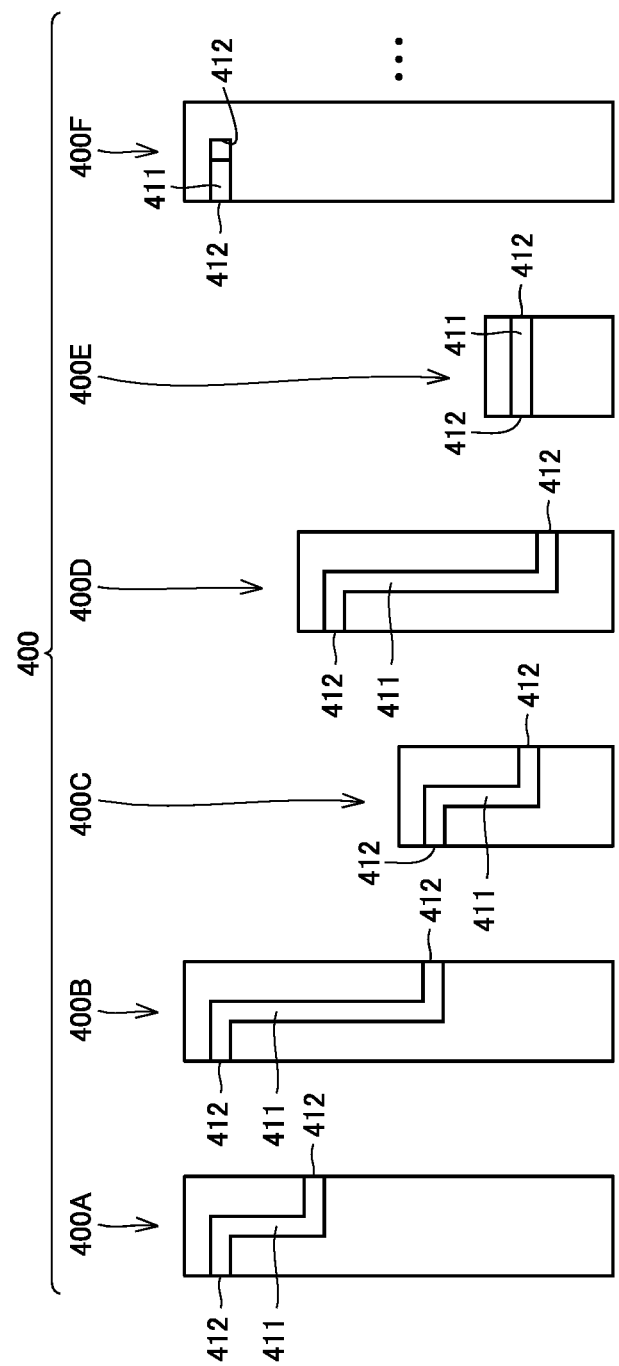
FIG. 18 is a cross sectional view showing cross sections of blocks that can be used to manufacture a mold.

FIG. 18 is a cross sectional view showing cross sections of blocks that can be used to manufacture a mold. With reference to FIG. 18, when manufacturing a mold, blocks having different heights are used. For example, the heights of a block 400A, a block 400C, a block 400D, and a block 400E are different from one another.

Moreover, blocks having the same height are different from one another in terms of shapes of through holes. Specifically, the locations of the openings of the through holes are different. For example, block 400A, block 400B, and block 400F have the same height and are different from one another in terms of the shapes of through holes 411 and the locations of openings 412. It should be noted that in block 400F, through hole 411 is bent at a right angle (direction normal to the cross section) with the height thereof being constant.

Typically, each of blocks 400A, 400B, 400C, . . . , has a rectangular parallelepiped outer shape. The shapes of the bottom surfaces of blocks 400A, 400B, 400C, . . . , are the same. Moreover, in the description below, the various types of blocks such as blocks 400A, 400B, 400C, . . . , will be collectively referred to as "block 400".

It should be noted that blocks 400 are appropriately selected from a plurality of types of blocks 400, based on the final outer shape of the mold. Moreover, blocks 400 are arranged on the base member such that the through holes are connected to one another (specifically, such that a flow path for allowing coolant to flow is formed by the through holes of the plurality of blocks 400).

Also in the present embodiment, as with the first embodiment, a mold having a desired shape is obtained by performing the "preparation of the base member and the blocks", the "arrangement of blocks", the "milling", and the "additive manufacturing and final machining".

Specifically, additive manufacturing apparatus 1030 of machine tool 1000 is used to perform additive manufacturing onto at least the exposed surfaces of milled blocks 400. Further, as the final machining, machine tool 1000 performs a surface finishing process to a metal layer formed by the additive manufacturing. By such a process, a mold serving as a final product is obtained.

Figure 19:
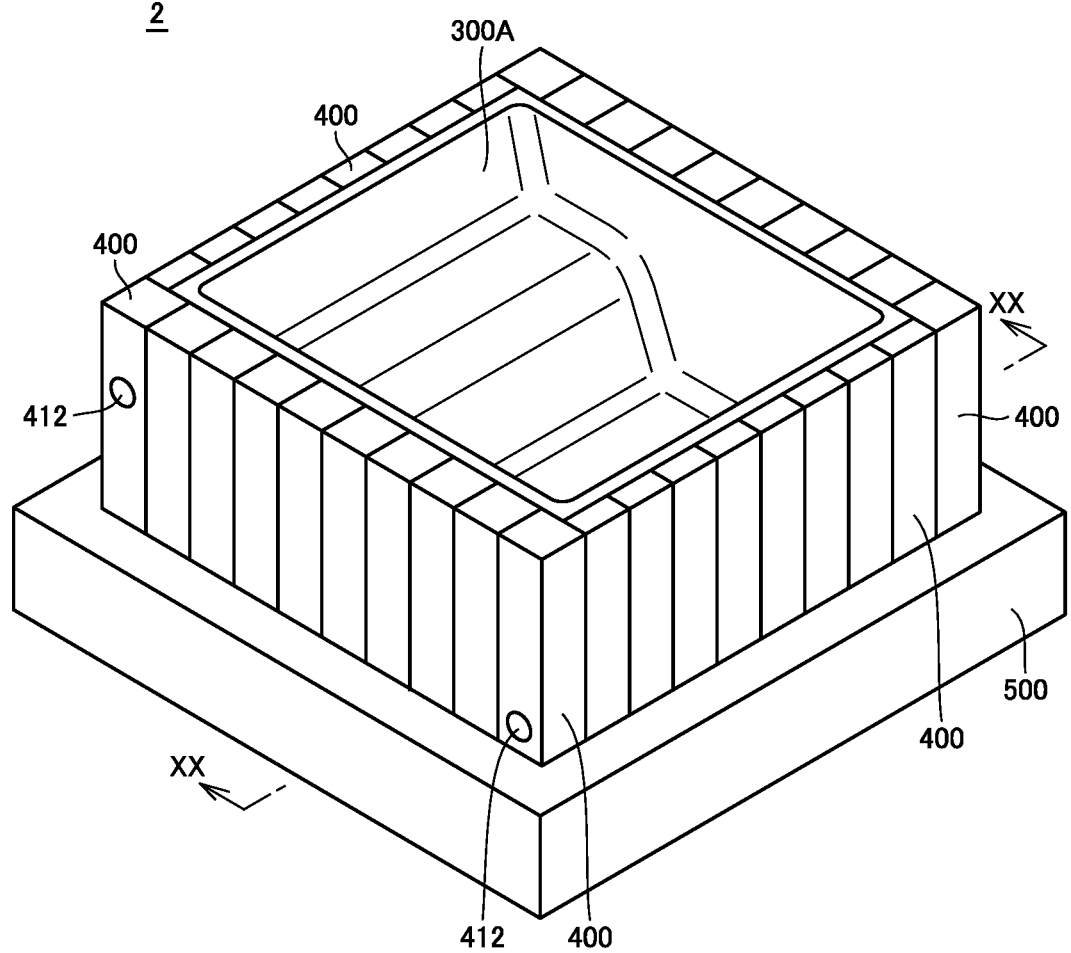
FIG. 19 is a perspective view of a mold serving as a final product according to the present embodiment.

FIG. 19 is a perspective view of a mold 2 serving as a final product according to the present embodiment. With reference to FIG. 19, mold 2 is constituted of: a base member 500; a plurality of blocks 400; and a metal layer 300A formed by the additive manufacturing so as to coincide with the final shape of the mold.

In mold 2, blocks 400 at the outer periphery have side surfaces located at the outer periphery side and not covered with metal layer 300. In mold 2, coolant is supplied into an opening 412 of a through hole 411 exposed to outside (for example, an opening 412 at the far side with respect to the plane of sheet of the figure). The coolant flows out of an opening 412 of another through hole 411 exposed to outside (for example, an opening 412 at the front side with respect to the plane of sheet of the figure).

Figure 20:
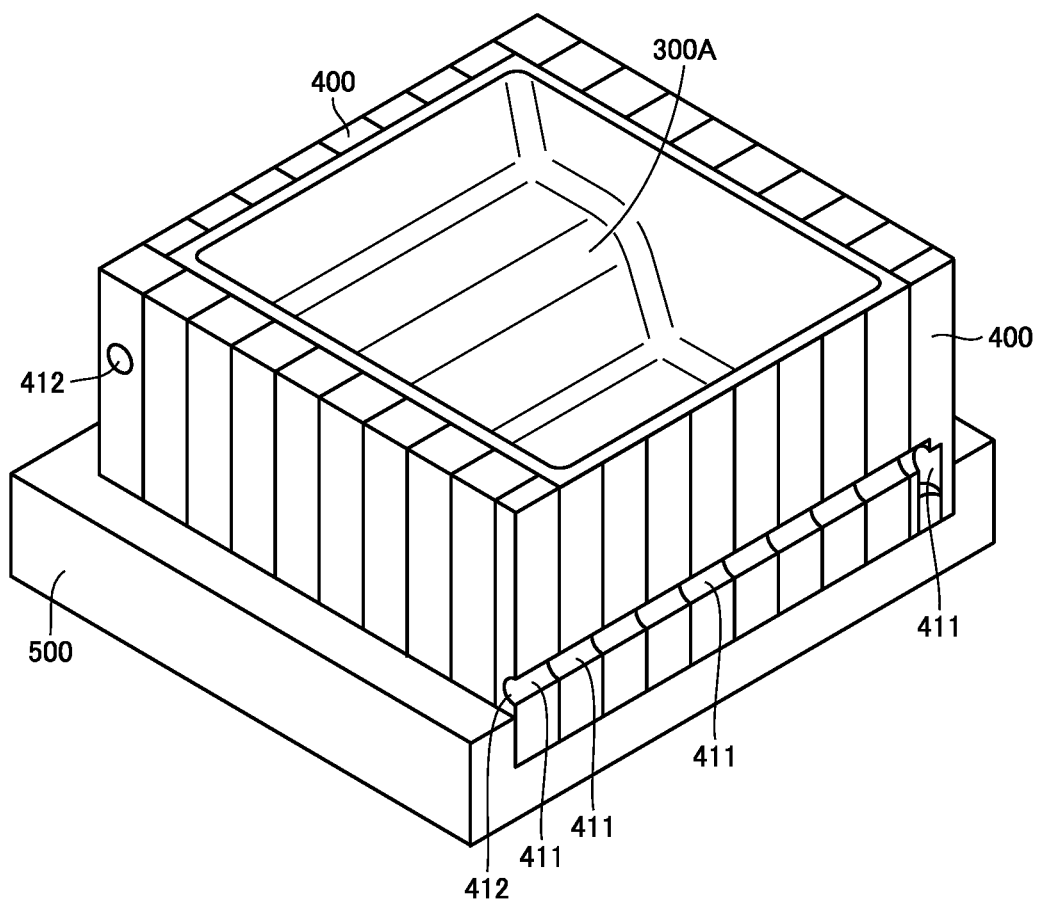
FIG. 20 is a cross sectional view taken along a line XX-XX in FIG. 19.

FIG. 20 is a cross sectional view taken along a line XX-XX in FIG. 19. With reference to FIG. 20, mold 2 has a flow path formed by connecting through holes 411 of the plurality of blocks 400 to one another.

Figure 21:
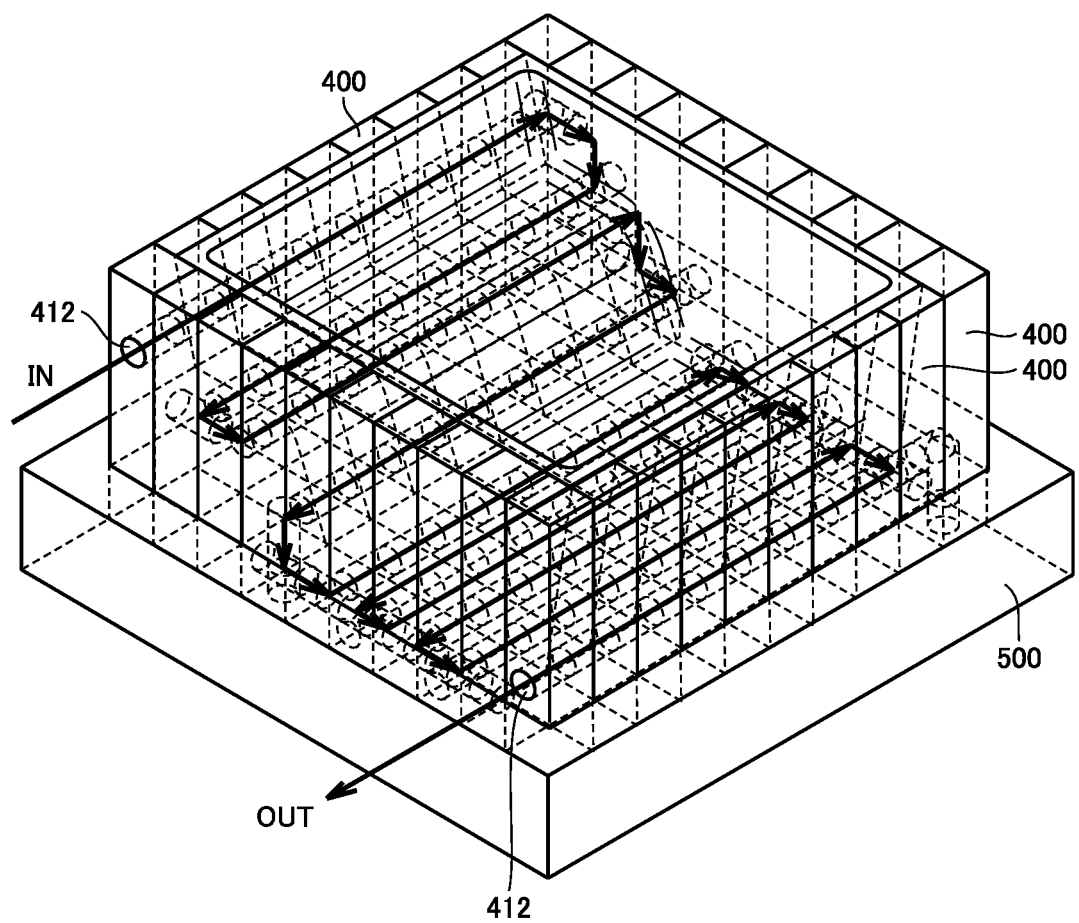
FIG. 21 is a transparent view of an internal structure of the mold.

FIG. 21 is a transparent view of an internal structure of mold 2. Specifically, FIG. 21 illustrates a direction in which the coolant flows in the flow path inside mold 2. With reference to FIG. 21, the coolant enters opening 412 at the far side, sequentially flows inside the plurality of blocks 400, and flows out of opening 412 at the front side. By providing such a flow path for coolant in mold 2 using the plurality of blocks 400, mold 2 can be cooled entirely by the coolant.

G. Conclusion (1) The above-described mold manufacturing method is performed to manufacture a mold 2 having a flow path for allowing coolant to flow in mold 2. The mold manufacturing method includes machining, based on a final outer shape of mold 2, a workpiece including a plurality of separate blocks 400. The plurality of separate blocks 400 are selected based on the outer shape, and each of all of the plurality of separate blocks 400 is provided with a through hole 411 for forming the flow path. The mold manufacturing method further includes adding a material to the workpiece through an additive manufacturing technology employing directed energy deposition as an additive manufacturing process, so as to form, on a surface of the milled workpiece, a continuous surface based on the outer shape.

According to the above-described mold manufacturing method, loss of material can be reduced as compared with a configuration employing the powder bed fusion as the additive manufacturing process. Moreover, since the plurality of blocks 400 are used, it is possible to reduce a period of time of manufacturing the mold as compared with the configuration employing the powder bed fusion. Thus, according to the mold manufacturing method according to the present embodiment, a mold having a flow path for allowing coolant to flow in the mold can be manufactured in a short period of time while reducing loss of material.

It should be noted that through holes 411 may be provided in only part of the plurality of separate blocks.

(2) Further, in the machining, the workpiece is machined with the workpiece being fixed to a base member 500 for forming mold 2.

(3) Further, an inlet (opening 412) of the flow path is formed in a first block of the plurality of separate blocks 400, and an outlet (opening 412) of the flow path is formed in a second block of the plurality of separate blocks 400.

(4) The plurality of separate blocks 400 include blocks having different sizes. According to such a configuration, mold 2 can be manufactured efficiently as compared with a case where the sizes of the blocks are the same.

(5) The mold manufacturing method further includes performing surface finishing by the machining to the continuous surface. The machining and the adding are performed in a machine tool. According to such a configuration, a period of time required to manufacture the mold can be shortened as compared with a case where the machining and the adding are performed in separate apparatuses.

Third Embodiment

H. Overview (Simplified Model)

Figure 22A:
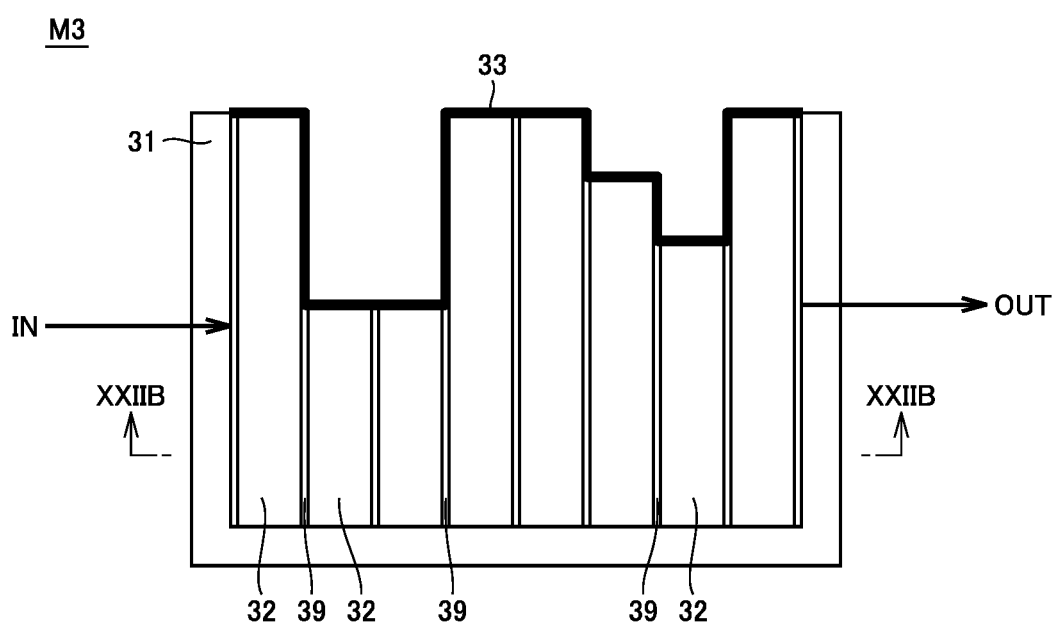
FIG. 22A is a cross sectional view of a simplified model according to still another embodiment.
Figure 22B:
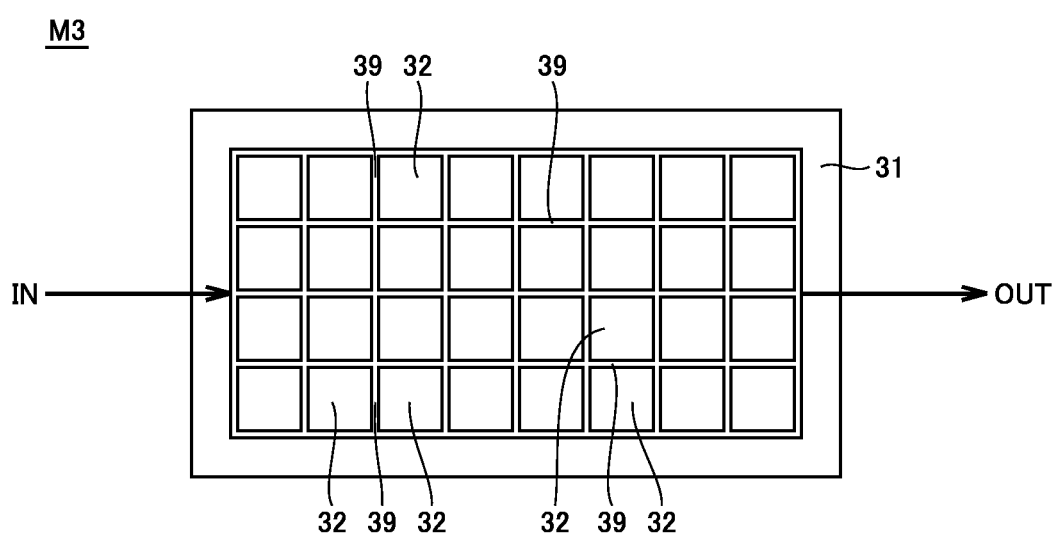
FIG. 22B is a cross sectional view taken along a line XXIIB-XXIIB in FIG. 22A.

Each of FIGS. 22A, 22B shows an overview of simplified model M3 according to the present embodiment. FIG. 22A is a cross sectional view of simplified model M3. FIG. 22B is a cross sectional view taken along a line XXIIB-XXIIB in FIG. 22A.

With reference to FIGS. 22A, 22B, in simplified model M3, a plurality of blocks 32 are arranged on base member 31. Moreover, on exposed surfaces (upper and side surfaces) of blocks 32, a metal layer 33 is formed by additive manufacturing.

Moreover, blocks 32 are arranged to form a space 39 between blocks 32. Further, blocks 32 are arranged to also form a space between a block 32 at an end and the inner wall of base member 31.

Specifically, through holes are formed in at least two of the four side surface portions of base member 31. Coolant enters simplified model M3 from a through hole of one side surface portion, and flows out of a through hole of the other side surface portion. It should be noted that although details will be described later, a plurality of through holes are formed in each of the two side surface portions.

I. Details of Manufacturing Process and Mold i1. Preparation of Base Member and Blocks The following specifically describes preparation (corresponding to step S1 of FIG. 5) of the base member and blocks.

Figure 23:
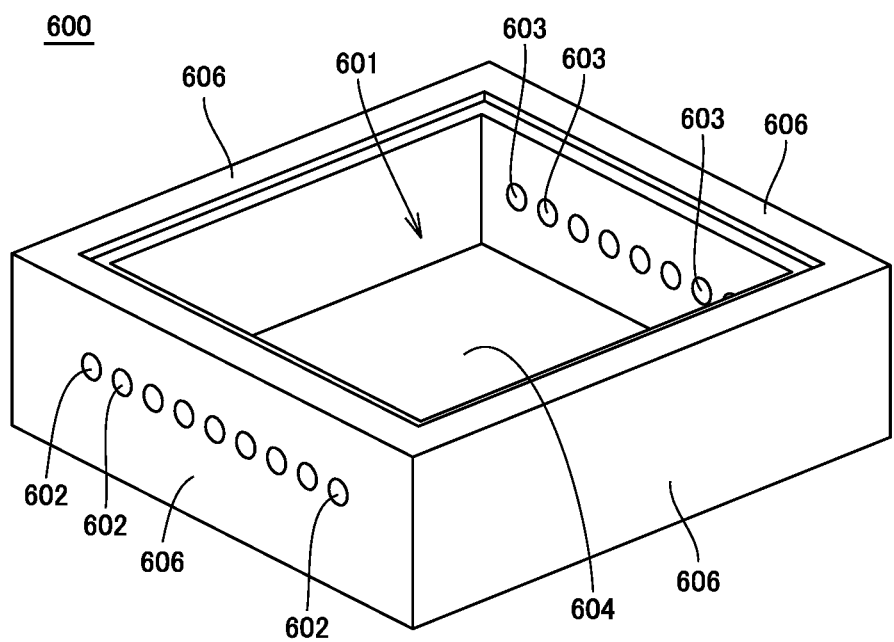
FIG. 23 is a perspective view of a base member for forming a mold.

FIG. 23 is a perspective view of a base member 600 for forming a mold. With reference to FIG. 23, base member 600 is constituted of a bottom portion 604 and four side portions 606 on the end area of bottom portion 604. Specifically, four side portions 606 are provided to surround bottom portion 604. An accommodation portion 601 is formed by bottom portion 604 and four side portions 606. One of four side portions 606 is provided with a plurality of through holes 602. Moreover, a plurality of through holes 603 are provided in a side portion 606 opposite to side portion 606 in which through holes 602 are provided.

As with the first embodiment, the blocks used in the present embodiment have different sizes (typically, heights). Moreover, unlike the first and second embodiments, each of the blocks is provided with no through hole.

It should be noted that although the following illustratively describes a case where each of the blocks has a rectangular parallelepiped shape, the configuration is not limited to this. The shape of the block may be a quadrangular prism shape other than the rectangular parallelepiped shape, or may be a polygonal prism shape other than the quadrangular prism shape. For example, by forming a honeycomb shape using regular hexagonal prisms, a surface area to be in contact with the coolant can be increased and resistance applied to the coolant can be reduced.

i2. Arrangement of Blocks

The following specifically describes an arrangement of the blocks (corresponding to step S2 of FIG. 5).

Figure 24:
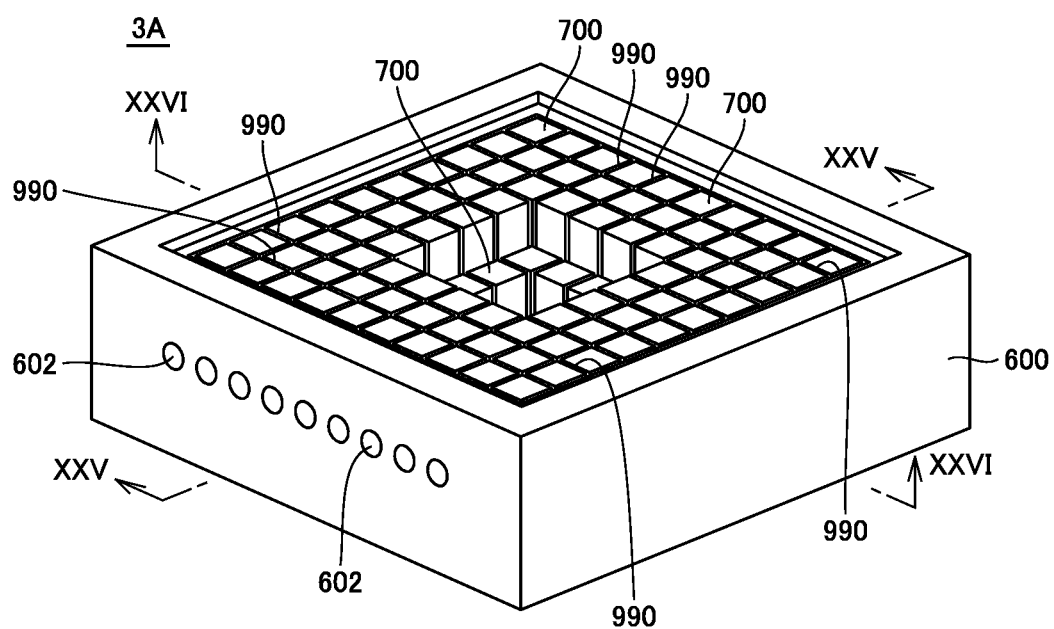
FIG. 24 shows an external appearance of an intermediate member obtained by arranging the plurality of blocks on the base member.

FIG. 24 shows an external appearance of an intermediate member 3A obtained by arranging the plurality of blocks 700 on base member 600. With reference to FIG. 24, blocks 700 selected based on the final outer shape of the mold are arranged in accommodation portion 601 of base member 600 based on the outer shape.

Specifically, blocks 700 are arranged on a surface of base member 600 to form a space between adjacent blocks 700. Further specifically, blocks 700 are arranged on bottom portion 604 with the side surfaces of blocks 700 being out of contact with each other (with space 990 therebetween) such that most of the area of the surface of bottom portion 604 is unseen.

Figure 25:
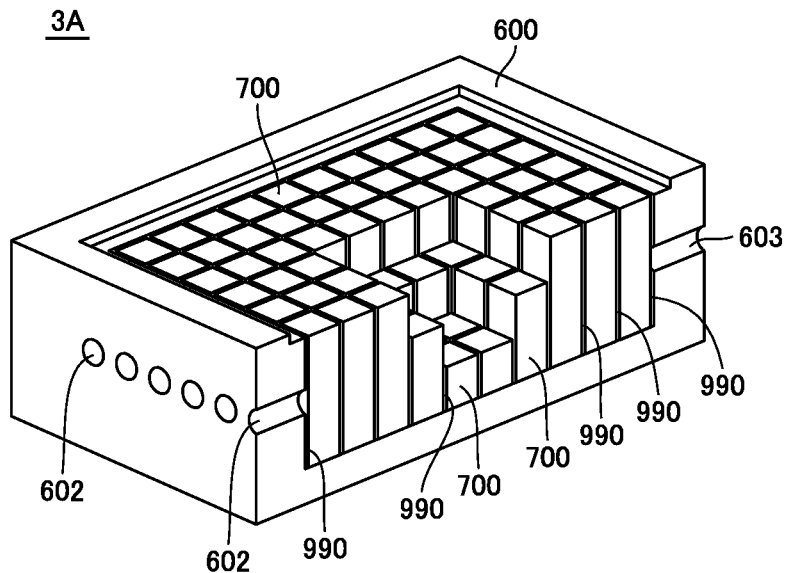
FIG. 25 is a cross sectional view taken along a line XXV-XXV in FIG. 24.

FIG. 25 is a cross sectional view taken along a line XXV-XXV in FIG. 24. With reference to FIG. 25, space 990 formed between blocks 700 forms a flow path for the mold with through hole 602 serving as an inlet and through hole 603 serving as an outlet, for example.

Figure 26:
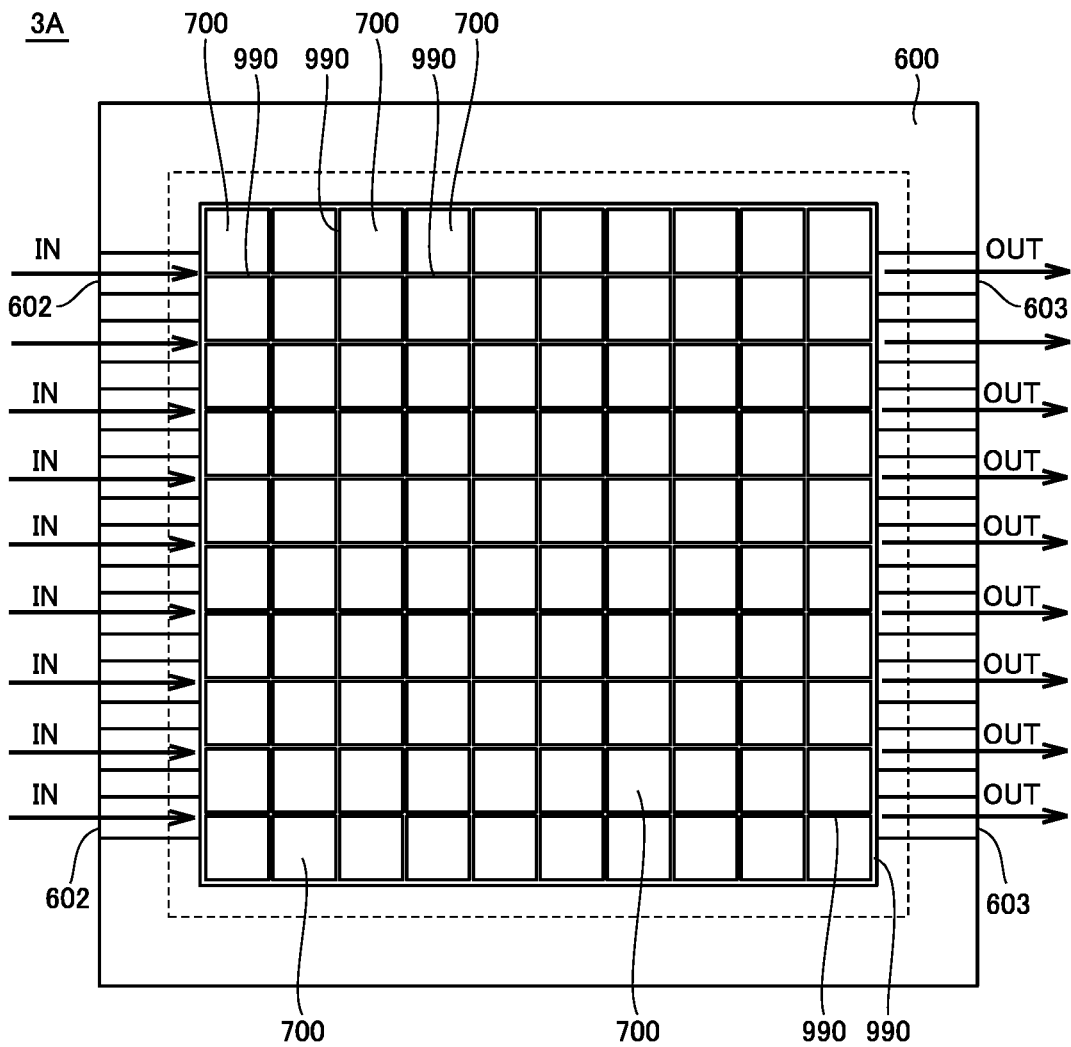
FIG. 26 is a cross sectional view taken along a line XXVI-XXVI in FIG. 24.

FIG. 26 is a cross sectional view taken along a line XXVI-XXVI in FIG. 24. With reference to FIG. 26, coolant enters from the plurality of through holes 602, passes through space 990, and can flow out of the plurality of through holes 603.

Accordingly, the plurality of blocks 700 and base member 600 are cooled. Further, a below-described metal layer 300B (see FIG. 29) formed to cover the upper surfaces of blocks 700 is also cooled.

i3. Milling

The following specifically describes milling (corresponding to step S3 of FIG. 5).

Figure 27:
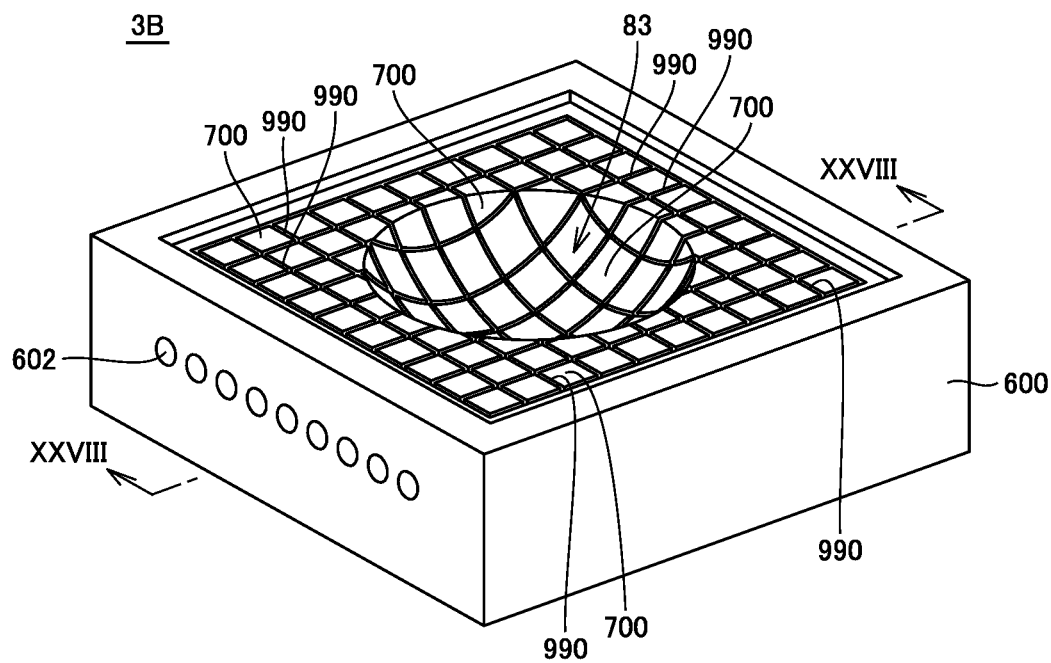
FIG. 27 shows an external appearance of an intermediate member obtained by milling the foregoing intermediate member.

FIG. 27 shows an external appearance of an intermediate member 3B obtained by milling intermediate member 3A. With reference to FIG. 27, by milling the tips of part of the plurality of blocks 700, intermediate member 3B having a curved surface 83 close to the final shape of the mold is obtained.

Figure 28:
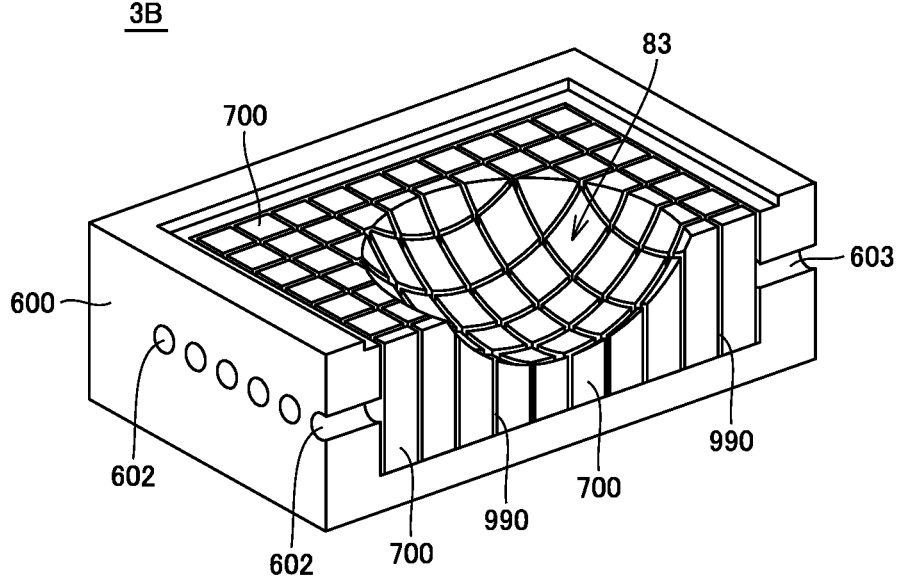
FIG. 28 is a cross sectional view taken along a line XXVIII-XXVIII in FIG. 27.

FIG. 28 is a cross sectional view taken along a line XXVIII-XXVIII in FIG. 27. With reference to FIG. 28, space 990 corresponding to the shape of curved surface 83 is formed around curved surface 83. That is, the length of space 990 in the height direction becomes short by milling as compared with a state (FIG. 25) before the milling.

i4. Additive Manufacturing and Final Machining

The following specifically describes additive manufacturing and final machining (corresponding to steps S4, S5 of FIG. 5).

Figure 29:
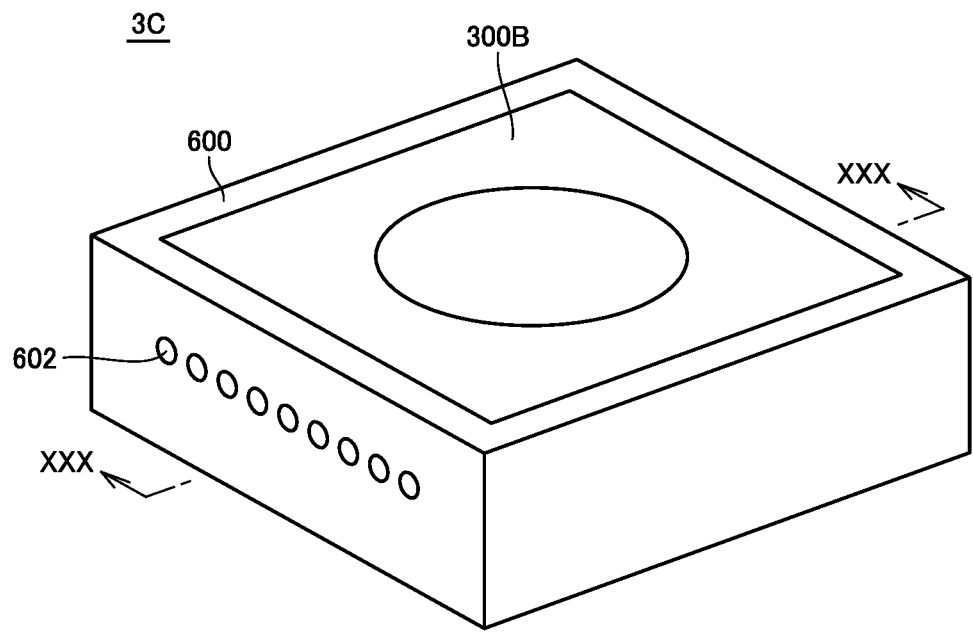
FIG. 29 shows an external appearance of a mold obtained by performing additive manufacturing and final machining to the intermediate member.

FIG. 29 shows an external appearance of a mold 3C obtained by performing additive manufacturing and final machining to intermediate member 3B. With reference to FIG. 29, additive manufacturing apparatus 1030 of machine tool 1000 is used to perform additive manufacturing onto at least the exposed surfaces of milled blocks 700. Further, as the final machining, machine tool 1000 performs a surface finishing process to metal layer 300B formed by the additive manufacturing. By such a process, mold 3C serving as a final product is obtained. It should be noted that in mold 3C, as with the first embodiment, all the blocks 700 are covered with metal layer 300B.

It should be noted that in the additive manufacturing process, metal layer 300B is formed to coincide with the final shape of the mold. That is, the material is added to the blocks along the shapes of the exposed surfaces of milled blocks 700 so as to coincide with the final shape of the mold.

Figure 30:
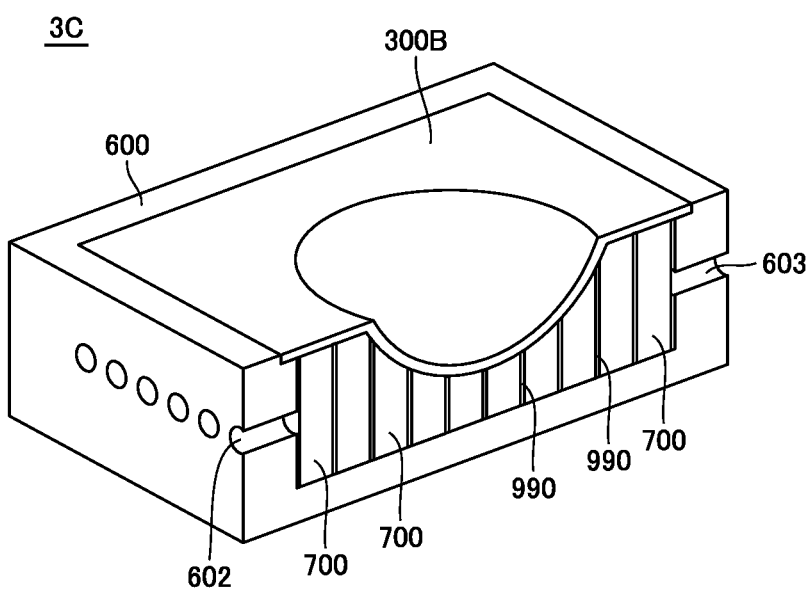
FIG. 30 is a cross sectional view taken along a line XXX-XXX in FIG. 29.

FIG. 30 is a cross sectional view taken along a line XXX-XXX in FIG. 29. With reference to FIG. 29, in mold 3C, the plurality of blocks 700 are embedded between base member 600 and metal layer 300B. Moreover, the upper end of space 990 is closed by metal layer 300B. Accordingly, the coolant does not flow out to the main surface of the mold (surface of metal layer 300B). Moreover, since the coolant can be in contact with metal layer 300B, mold 3C is excellent in the cooling effect.

As such, the flow path for allowing the coolant to flow is formed entirely inside mold 3C by through holes 602, space 990 formed by adjacent blocks 700, and through holes 603.

J. Conclusion (1) The above-described mold manufacturing method is performed to manufacture a mold 3C having a flow path for allowing coolant to flow in mold 3C. The mold manufacturing method includes machining, based on a final outer shape of mold 3C, a workpiece including a plurality of separate blocks 700, the machining being performed with the workpiece being accommodated in a base member 600 for forming mold 3C. The plurality of separate blocks 700 are selected based on the outer shape, and the plurality of separate blocks 700 are arranged on a surface of base member 600 so as to form a space between adjacent blocks 700 in order to form the flow path. The mold manufacturing method further includes adding a material to the workpiece through an additive manufacturing technology employing directed energy deposition as an additive manufacturing process, so as to form, on a surface of the machined workpiece, a continuous surface based on the outer shape.

According to the above-described mold manufacturing method, loss of material can be reduced as compared with a configuration employing the powder bed fusion as the additive manufacturing process. Moreover, since the plurality of blocks 700 are used, it is possible to reduce a period of time of manufacturing the mold as compared with the configuration employing the powder bed fusion. Thus, according to the mold manufacturing method according to the present embodiment, a mold having a flow path for allowing coolant to flow in the mold can be manufactured in a short period of time while reducing loss of material.

Moreover, since each of blocks 700 is not provided with a through hole, blocks 700 can be readily prepared.

(2) Base member 600 has a bottom portion 604 and a plurality of side portions 606 (typically, four side portions) formed on an end area of bottom portion 604. A through hole 602 serving as an inlet of the flow path is formed in a first side portion of the plurality of side portions 606, and a through hole 603 serving as an outlet of the flow path is formed in a second side portion of the plurality of side portions.

(3) The second side portion is located opposite to the first side portion. A plurality of through holes 602 and a plurality of through holes 603 are formed.

According to the configuration, an amount of coolant that can be allowed to flow in mold 3C within a unit time can be increased as compared with a case where one through hole 602 and one through hole 603 are provided.

(4) The plurality of separate blocks 700 include blocks having different sizes. According to such a configuration, mold 2 can be manufactured efficiently as compared with a case where the sizes of the blocks are the same.

(5) The mold manufacturing method further includes performing surface finishing by machining to the continuous surface. The machining and the adding are performed in a machine tool. According to such a configuration, a period of time required to manufacture the mold can be shortened as compared with a case where the machining and the adding are performed in separate apparatuses.

The embodiments disclosed herein are illustrative and are not limited to only the content above. The scope of the present invention is defined by the terms of the claims, and is intended to include any modifications within the scope and meaning equivalent to the terms of the claims.

REFERENCE SIGNS LIST

1A, 1B, 3A, 3B: intermediate member; 1C, 2, 3C: mold; 11, 21, 31, 100, 500, 600: base member; 12, 22, 32, 200, 200A, 200B, 200C, 400, 400A, 400B, 400C, 400D, 400E, 400F, 700: block; 13, 23, 33, 300, 300A, 300B: metal layer; 39, 990: space; 81, 83: curved surface; 101, 601: accommodation portion; 102, 103, 211, 411, 602, 603: through hole; 104, 604: bottom portion; 105: groove; 106, 606: side portion; 201, 201A, 201B, 201C: cap portion; 202, 202A, 202B, 202C: main body portion; 213, 412: opening; 215: recess; 216: hole; 219: protrusion; 1000: machine tool; 1011: operating system; 1013: main shaft head; 1014: spindle; 1021: automatic tool changer; 1030: additive manufacturing apparatus; 1039: holder; 1040: tool holder; 1310: application unit; 1311: tip; 1320: attachment unit; 1330: hose unit; M1, M2, M3: simplified model.

The invention claimed is:

1. A mold manufacturing method for manufacturing a mold having a flow path for allowing coolant to flow in the mold, the mold manufacturing method comprising:
    machining, based on a final outer shape of the mold, a workpiece including a plurality of separate components, the plurality of separate components being selected based on the outer shape, each of all or part of the plurality of separate components being provided with a through hole for forming the flow path; and adding a material to the workpiece through an additive manufacturing technology employing directed energy deposition as an additive manufacturing process, so as to form, on a surface of the machined workpiece, a continuous surface based on the outer shape.

2. The mold manufacturing method according to claim 1, wherein in the machining, the workpiece is machined with the workpiece being fixed to a base member for forming the mold.

3. The mold manufacturing method according to claim 2, wherein a groove is provided in the base member, and the groove is connected to the through hole.

4. The mold manufacturing method according to claim 3, wherein a plurality of the grooves are provided in a surface of the base member at the workpiece side, an opening of the through hole is provided at a surface of each of the components, the surface of each of the components being in contact with the base member, and the grooves are connected to the through holes by fixing the components to the base member such that respective locations of the openings of the through holes coincide with respective locations of the grooves.

5. The mold manufacturing method according to claim 1, wherein an inlet of the flow path is formed in a first component of the plurality of separate components, and an outlet of the flow path is formed in a second component of the plurality of separate components.

6. The mold manufacturing method according to claim 1, wherein the plurality of separate components include blocks having different sizes.

7. The mold manufacturing method according to claim 1, further comprising performing surface finishing by machining to the continuous surface, wherein the machining and the adding are performed in a machine tool.

8. A mold manufacturing method for manufacturing a mold having a flow path for allowing coolant to flow in the mold, the mold manufacturing method comprising:

machining, based on a final outer shape of the mold, a workpiece including a plurality of separate components, the machining being performed with the workpiece being accommodated in a base member for forming the mold, the plurality of separate components being selected based on the outer shape, the plurality of separate components being arranged on a surface of the base member so as to form a space between adjacent components in order to form the flow path; and adding a material to the workpiece through an additive manufacturing technology employing directed energy deposition as an additive manufacturing process, so as to form, on a surface of the machined workpiece, a continuous surface based on the outer shape.

9. The mold manufacturing method according to claim 8, wherein the base member has a bottom portion and a plurality of side portions formed on an end area of the bottom portion, a second through hole serving as an inlet of the flow path is formed in a first side portion of the plurality of side portions, and a third through hole serving as an outlet of the flow path is formed in a second side portion of the plurality of side portions.

10. The mold manufacturing method according to claim 9, wherein the second side portion is located opposite to the first side portion, and a plurality of the second through holes and a plurality of the third through holes are formed.

\* \* \* \* \*